US010036830B2

(12) United States Patent
Maschhoff et al.

(10) Patent No.: US 10,036,830 B2
(45) Date of Patent: Jul. 31, 2018

(54) DEVICE AND METHOD FOR MAKING WEATHER OBSERVATIONS USING INFRARED SPECTRAL RADIOMETRY

(71) Applicants: Kevin R. Maschhoff, Wakefield, MA (US); John J. Polizotti, Pittsfield, NH (US); Gerard M. Perron, Acton, MA (US)

(72) Inventors: Kevin R. Maschhoff, Wakefield, MA (US); John J. Polizotti, Pittsfield, NH (US); Gerard M. Perron, Acton, MA (US)

(73) Assignee: BAE Systems Information and Electronics Systems Integration Inc., Nashua, NH (US)

( * ) Notice: Subject to any disclaimer, the term of this patent is extended or adjusted under 35 U.S.C. 154(b) by 0 days.

(21) Appl. No.: 14/985,763

(22) Filed: Dec. 31, 2015

(65) Prior Publication Data

US 2016/0187535 A1    Jun. 30, 2016

Related U.S. Application Data

(60) Provisional application No. 62/098,468, filed on Dec. 31, 2014.

(51) Int. Cl.
*G01W 1/10* (2006.01)
*G01J 3/02* (2006.01)
(Continued)

(52) U.S. Cl.
CPC .............. *G01W 1/10* (2013.01); *G01J 3/021* (2013.01); *G01J 3/0208* (2013.01);
(Continued)

(58) Field of Classification Search
None
See application file for complete search history.

(56) References Cited

U.S. PATENT DOCUMENTS 6,371,413 B1 *   4/2002   Duchon ................... B64G 1/24
                                                        244/164
6,868,316 B1 *   3/2005   Stevens ................ G05D 1/0883
                                                        244/171

OTHER PUBLICATIONS

Aufmann, Hartmut H. et al. "AIRS/AMSU/HSB on the Aqua Mission: Design, Science Objectives, Data Products, and Processing Systems" IEEE Trans. on Geosci. and Remote Sensing, vol. 41, No. 2, Feb. 2003.*

* cited by examiner

*Primary Examiner* — Edwin Gunberg
(74) *Attorney, Agent, or Firm* — Davis & Bujold, PLLC

(57) ABSTRACT

A method of weather observations by a constellation comprises at least a first cluster of three micro-satellites each orbiting around earth, and each micro-satellites comprises a spectrometer. Orbiting the three micro-satellites of the first duster around the earth in three separate orbits offset with respect to one another. Staggering the three micro-satellites with respect to one another as they orbit. Selecting the offset and the staggering, of each of the three micro-satellites with respect to one another, so that each one of the three micro-satellites have a substantially identical viewing area as each one of the three micro-satellites orbits around the earth. Sequentially collecting observations, from each of the three micro-satellites, as the micro-satellites orbit around the earth and observe substantially identical viewing areas, to separately gather atmospheric measurements and provide critical data for weather forecasting by infrared temperature and humidity soundings and motion vector winds of the earth.

20 Claims, 10 Drawing Sheets

(51) Int. Cl.
*G01J 3/18* (2006.01)
*G01J 3/28* (2006.01)
*G01J 5/60* (2006.01)
*G01J 5/00* (2006.01)

(52) U.S. Cl.
CPC ........... *G01J 3/0256* (2013.01); *G01J 3/0286* (2013.01); *G01J 3/0291* (2013.01); *G01J 3/18* (2013.01); *G01J 3/2803* (2013.01); *G01J 5/007* (2013.01); *G01J 5/60* (2013.01)

1st ORBIT     2nd ORBIT     3rd ORBIT

DEVICE AND METHOD FOR MAKING WEATHER OBSERVATIONS USING INFRARED SPECTRAL RADIOMETRY

CROSS REFERENCE TO RELATED APPLICATIONS/PRIORITY

This application claims priority benefits of U.S. Application Ser. No. 62/098,468 filed Dec. 31, 2014, which disclosure is hereby incorporated by reference in its entirety.

FIELD OF THE INVENTION

The present invention relates to a weather observation system and method incorporating the same. More particularly, the invention relates to atmospheric measurements for the purpose of providing critical data for weather forecasting by means of infrared temperature and humidity soundings and motion vector winds.

BACKGROUND OF THE INVENTION

Numerous studies illustrating the substantial potential for weather forecast improvements due to rapidly refreshed high spectral resolution infrared spectral sounding measurements have been conducted. In general, these benefits are the result of comparative measurements that show the development of unstable atmospheric conditions or that reveal motion of the atmosphere at different altitudes.

Recent analysis by members of the NASA Atmospheric Infrared Sounder (AIRS) AIRS Science Team shows that observations in the spectral range 1950-2450 cm−1 at AIRS' spectral resolution, result in vertical temperature profile retrieval accuracy in the lower troposphere nearly as good as that derived using the full AIRS spectral channel set. FIG. 1A shows Radiation Monitoring System (RMS) differences from European Centre for Medium Range Weather Forecasts (ECMWF) "truth" of Quality Controlled (QC'd) AIRS/AMSU (Advanced microwave sounding unit) temperature profile retrievals obtained when using all AIRS channels in the left side solid line and the left side dashed line, and when using all but 15 μm or 11 μm AIRS bands in the right side solid line and the right side dashed line. The results are shown using two QC procedures: Data Assimilation Quality Control (DAQC) which accepts fewer but more accurate retrievals; and Climate Quality Control (CQC), which accepts many more retrievals derived under more difficult cloud conditions. Results obtained using only mid-shortwave channels are somewhat degraded from those using all AIRS channels, but are still very good using either QC procedure.

However, there still exists a need for a higher spatial resolution system which would increase cloud contrast and result in further improved results using either DAQC or CQC procedure.

FIG. 1B shows improvements in GCM resolution compared to infrared and microwave observations over the past three decades. This trend line also indicates a need for models which can operate at a planned horizontal spatial resolution of 2-3 km within the next decade.

However, the Inventors have found that validation of a model of a given resolution must have observations as good as, or better than, the model itself, in order to minimize errors due to Nyquist (mathematical sampling theorem) spatial filtering processes in the models. Thus, there still exists a need for a higher spatial resolution system which would provide increased observation density in order to enable the data to better meet the information needs of the next generation of General Circulation Models (GCM). For example, cloud resolving models under development today should form the basis for the next generation of weather and climate models.

SUMMARY OF THE INVENTION

Wherefore, it is the object of the present invention to overcome the above mentioned shortcomings and drawbacks associated with the prior art, More specifically, 1) present infrared hyperspectral methods observe the atmosphere too infrequently, and at too coarse a spatial resolution in order to resolve rapidly changing and fine-scale weather patterns, and 2) present multi-spectral (not hyperspectral) motion-vector winds methods used from GEO orbit lack sufficient information on the height or altitude in the observed wind-tracer features above the ground, resulting in substantial errors in the assigned wind velocity vector.

Another object of the invention is to provide several, preferably three (3), imaging spectral radiance observations of each region from instruments carried by each of several nano-satellites in LEO (low earth orbit), allowing only a brief of elapsed time (e.g., 15-30 minutes) between each observation, for the purposes of observing the horizontal motion of features in the atmosphere (e.g., wind tracers) that enable the observation of the wind field at different heights above the ground.

Another object of the invention is to employ a sufficient spectral resolution and range for each of these observations to enable extraction of the vertical temperature and moisture profiles from the observations, independent of any numerical weather prediction or analysis model. Specifically, emission spectra from the regions dominated by both carbon dioxide emission and from the regions dominated by water vapor emission are both used.

Another object of the invention is to provide imaging spectral radiances with a horizontal spatial resolution of 3-4 km, the scale of a typical storm, while providing the vertical resolution of temperature and moisture profiles of 1-2 km in the troposphere, similar to those provided by current infrared spectral sounders such as the NASA AIRS instrument.

Another object of the invention is to employ an innovative compact spectral disperser element, as a modification of the optical design of each instrument, thereby enabling an instrument of much smaller size than those of current designs, in order to reduce the associated mass and cost of each satellite forming a constellation.

Another object of the invention is to employ an array of HgCdTe avalanche photodiodes, which enable the low-noise observation of spectral radiances at higher detector operating temperatures than present-day infrared detector technology, substantially reducing the cooling (as well as the electrical power) requirements of the spectral instrument.

The present invention is designed to obtain measurement of wind at a multitude of particular altitude levels in the atmosphere by:

Observing the motion (speed and direction) of recognizable and trackable features within the two-dimensional spectral radiance field associated with a particular altitude by observing this radiance field at least two distinct times using at least two separate spectral sensors aboard at least two separate micro-satellites in a low earth orbit;

Making measurements at a multitude of altitudes (e.g., typically between 6-8) by (nearly) simultaneously observing these two-dimensional radiance fields in a multitude of spectral bands, including a sub-set of several of the spectral bands whose radiance fields are emitted predominantly within a narrow pressure-height range; and Using the mid-wave spectral region (e.g., 4.1-5.25 micrometers) for these measurements to include spectral channels that include absorption characteristics of carbon dioxide and water vapor to allow accurate vertical height assignment to the observed features.

While the concept of using spectrally resolved measurements, at separate times, for make wind measurements is generally know, such measurements—according to conventional prior art techniques—have only been envisioned with radiance measurements from a single sensor (at different times) hosted aboard a satellite in a geostationary orbit. The present invention is directed at making such measurements, from multiple low-cost instruments orbiting in a low-earth orbit (where each sensor and spacecraft can be dramatically smaller in size and installed at a lower cost), but where each sensor makes only one measurement of the spectral radiance field.

An important aspect of the present invention is to provide a method and a system with optically design instrumentation and a spectral range that allows effective measurement of the vertical temperature profile together with the radiance fields used for the wind measurements. Due to all of the above information obtained by the present invention, especially the vertical temperature profile measurements, the present invention has the ability to make accurate height (altitude) assignments of the observed tracked features. According to the invention, such height assignment measurements are performed using dispersive spectroscopy with spectral channels in the 4.1-4.3 micrometer range (following the NASA AIRS instrument demonstrated capability—and BAE SYSTEMS Information and Electronic Systems Integration Inc. of Nashua, N.H. built AIRS for NASA).

The present invention also extends the spectrally resolved (vertically resolved) wind measurements to high spectral resolution, allowing for 6-8 vertical levels rather than ~2 levels typically provided by geo sensors.

Another object of the invention, besides the measurement method using a plurality of micro-satellites, are methods to allow the spectrometer payload to have small enough size, mass, and power requirements so that hey can readily fit on and orbit in a micro-satellite. Given current micro-satellite technology, approximate numbers for the maximum power demand are typically less than 50 Watts and the mass for the sensor less than 110 pounds (50 kg), and generally less than 33 pounds (15 kg). In order to achieve this, the present invention includes a modified spectrometer design that allows operation ata relatively high spectrometer operating temperature—which allows much less cooling to be employed, thereby saving mass and power. This spectrometer design is derived from one used for HyLITE and Scotland (Airborne Hyperspectral Imaging Programs for the government), but is modifying and applying the design to solve a resource/minimization problem in a unique way.

Additionally, the present invention uses a detector array based on Avalanche Photo-Diodes (APDs), and operates these photodiodes at a much higher operating temperature than normally operated photodiodes for this application. Typically, operation at higher detector temperature (on the order of 90° K or 100° K for example) is not acceptable, because the detector noise is too high relative to the remotely sensed radiances. By using Avalanche Photo-Diodes, the present invention provides gain on the signal (but not the dark current and its noise) to raise the signal above the detector noise experienced at a higher operating temperature.

The present invention also includes an improved spectrometer optical concept that minimizes the required size of the infrared spectrometer without adding in components or design features that would require a much lower operating temperature. More specifically, the present invention includes a refractive element, added to a conventional Offner spectrometer, which is proximate to the grating and slightly impacts the thermal load, but also provides important size reduction.

The present invention also relates to a method of weather observations by a constellation in which the constellation comprises at least a first cluster of three micro-satellites each orbiting around earth, and each of the three micro-satellites comprising a spectrometer, the method comprising: orbiting the three micro-satellites of the first cluster around the earth in three separate orbits with each of the three separate orbits being offset with respect to one another; staggering the three micro-satellites with respect to one another as the micro-satellites orbit in the respective orbits; selecting the offset and the staggering, of each of the three micro-satellites with respect to one another, so that each one of the three micro-satellites have a substantially identical viewing area as each one of the three micro-satellites orbits around the earth; and sequentially collecting observations, from each of the three micro-satellites of the first cluster as the three micro-satellites orbit around the earth and each observe the substantially identical viewing area, to separately gather atmospheric measurements and provide critical data for weather forecasting by infrared temperature and humidity soundings and motion vector winds of the earth.

The present invention further relates to a method of weather observations by a constellation in which the constellation comprises first, second, third and fourth clusters, and each of the first, the second, second, the third and the fourth clusters comprising three separate micro-satellites orbiting around earth, the method comprising: arranging the first cluster, the second cluster, the third cluster and the fourth cluster to orbit around the earth with orbits of the first cluster, the second cluster, the third cluster and the fourth cluster forming a similar angle with respect to each adjacent cluster and crisscrossing with respect to one another; orbiting the three micro-satellites, of each respective cluster, in three separate orbital paths with each of the three separate orbital paths being offset with respect to one another and such that each of the orbital paths, of the three micro-satellites, crisscross one another; staggering the three micro-satellites, of each respective cluster, with respect to one another; selecting the offset and the staggering, of each of the three micro-satellites of each respective cluster with respect to one another, so that each one of the three micro-satellites, of each respective cluster, have substantially identical orbital paths and viewing areas as the three micro-satellites, of each respective cluster, orbit around the earth along their respective orbital path; and sequentially collecting observations, from each of the three micro-satellites of the first cluster, the second cluster, the third cluster, and the fourth cluster as the respective three micro-satellites orbit around the earth and respectively observe the substantially identical viewing areas, to separately gather atmospheric measurements and provide critical data for weather forecasting by infrared temperature and humidity soundings and motion vector winds of the earth.

As used within this specification and the appended claims, the term "micro-satellite" means a satellite which has a combined mass, for the sensor, of less than or equal to 110 pounds (e.g., about 50 kg).

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. The invention will now be described, by way of example, with reference to the accompanying drawings in which.

It should be understood that the drawings are not necessarily to scale and that the disclosed embodiments are sometimes illustrated diagrammatical and in partial views. In certain instances, details which are not necessary for an understanding of this disclosure or which render other details difficult to perceive may have been omitted. It should be understood, of course, that this disclosure is not limited to the particular embodiments illustrated herein.

DETAILED DESCRIPTION OF THE PREFERRED EMBODIMENTS

The present invention may be understood by reference to the following detailed description, which should be read in conjunction with the appended drawings. It is to be appreciated that the following detailed description of various embodiments is by way of example only and is not meant to limit, in any way, the scope of the present invention.

Figure 1A:
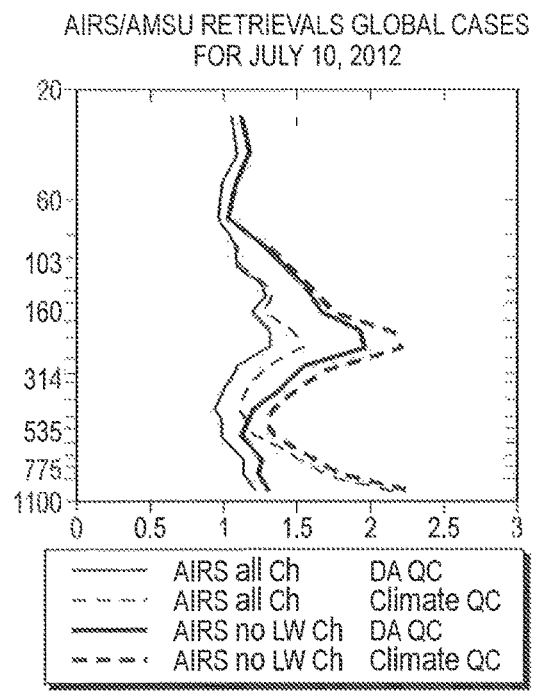
FIG. 1A is a graph showing AIRS Vertical Temperature Profile Accuracy with Different Spectral Channel Sets.
Figure 1B:
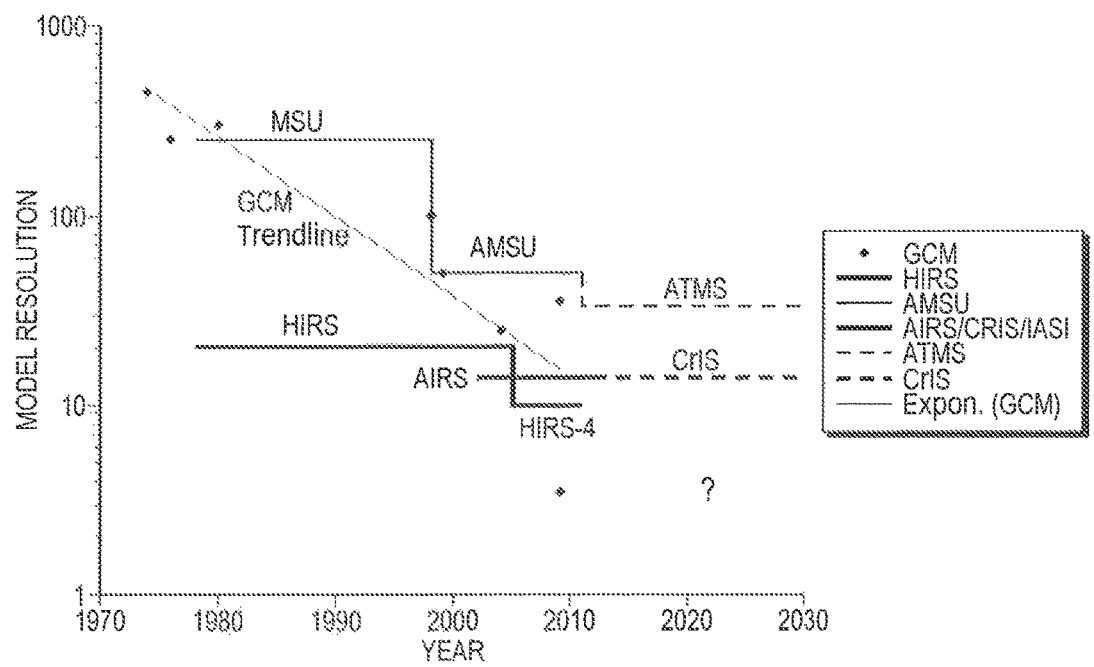
FIG. 1B is a graph showing forecasted improvements in GCM modeling, IR, μ-wave, and climate instrument resolutions according to the present invention.
Figure 2:
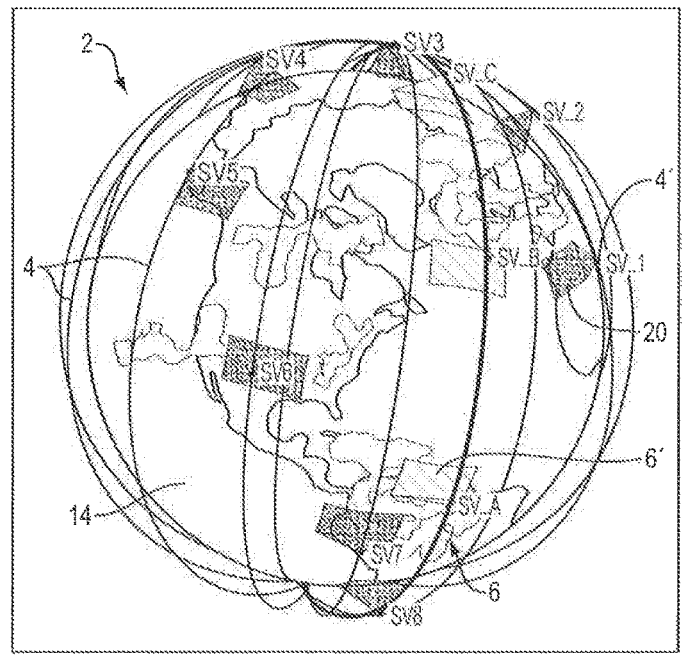
FIG. 2 is a schematic drawing showing temperature and humidity sounding constellation options of an embodiment of the present invention.

Turning now to FIG. 2, a brief description concerning the various satellite systems and constellations 4, of the system 2 of the present invention will now be briefly discussed. FIG. 1B is a schematic drawing showing temperature and humidity sounding constellations 4, according to one embodiment of the invention. A first constellation 4 comprises at least eight different separate micro-satellite 4', which provide observations of the same area every 90 minutes. A second constellation 6, comprises at least three separate micro-satellite 6' which provide three similar but separate observations of a region and each of the observations are separated from one another by a few minutes or so. By comparing each of the three similar observations, the Inventors have determined that it is possible to support vertically resolved motion vector winds observation.

As can be seen in this embodiment, one major weather observation system benefit obtained by restricting the spectral coverage to these Medium Wavelength Infrared (MWIR) channels, e.g., 3-5 μm wave length for example, is that these observations can be affordably provided at much greater frequency. This enables the coverage frequency, according to the present invention, to be provided at the same rate or approach the refresh rates possible from Group on Earth Observations (GEO), by using a series of observations from the two sets of constellations 4, 6 which each include at least three micro-satellite 4', 6' hosting small infrared (IR) sounding spectrometer pay-loads.

The satellite constellations 4, 6, used in carrying out the invention, will provide these MWIR measurements of the troposphere (especially the lower troposphere and boundary layer) prior to cloud formation. These constellations 4, 6 will also provide useful information that the weather models require in order to predict where a new storm(s) will develop—at an observation tempo that makes it much more likely that conditions for storm development will be witnessed by the method and the system 2 according to the present invention.

Other segments of the weather-observing system 2 of the two satellite constellations 4, 6 provide sufficient observations for monitoring to changes in the upper troposphere and the lower stratosphere, either in clear fields (using IR-sounders such as AIRS), and cloudy fields (using microwave sounders, and Global Positioning Satellite Radio Occultation (GPS-RO) in Low Earth Orbit (LEO).

Additionally, the two constellations 4, 6, used with the present invention, would begin operations after the introduction of the Geostationary Operational Environmental Satellite R-Series (GOES-R) Advanced Baseline Imagers (ABI) over the United States along with comparable meteorological imaging capability provided by European Organization for the Exploitation of Meteorological Satellites (EU-METSAT).

According to the present invention, the high spatial resolution/rapid refresh data, acquired from the imagers of these micro-satellites, can be used together with observations and additional data in order to ensure accurate identification of partially cloudy sounding fields of view and provide cloud phase information.

The increased observation density will enable the invention data to better meet the information requirements of the next generation of General Circulation Models (GCM). In this way, cloud resolving models, under development today, form the basis for the next generation of weather and climate models, as envisioned by the present invention. As previously stated, FIG. 1B depicts the past improvements in GCM resolution compared to infrared and microwave observations over the past three decades. FIG. 1B also shows a trend line which indicates a need for a new model which can operate, within the next decade, at a planned horizontal spatial resolution of 2-3 km. Prior work demonstrates that validation of a model of a given resolution must have observations as good as, or better than, the model itself in order to minimize errors due to NYQUIST spatial filtering processes in the models. Therefore, within the next decade, the constellation system 2 of the present invention is designed to provide observations as good as, or better than, the model itself with a planned horizontal spatial resolution of greater than 2-3 km.

The inventive constellation system 2, according to the present invention, will also provide higher horizontal resolution measurements by any of the high-vertical-resolution instruments in this weather observing system 2 of the satellite systems 4', 6'. The horizontal resolution measurements of Infrared Atmospheric Sounding Inferometer (IASI) and Joint Polar Satellite System (JPSS) resolution are coarser than 10 km. The horizontal resolution of the microwave sounders and the GPS-RO soundings, according to the present invention, are finer than 10 km. Thus, the assimilated data, according to the present invention, provides a primary constraint on the fine-scale atmospheric structure forecast of future regional and mesoscale numerical weather models. The higher spatial resolution of the invention will result in a higher fraction of cloud-free scenes.

Analyses with AIRS and Moderate Resolution Imaging Spectroradiometer (MODIS) data demonstrate that increasing the spatial resolution from 13.5 km, for AIRS, to about 2-3 km, according to the present invention, results in a ~2× improvement in cloud-free yield.

Currently, only cloud-free radiances from AIRS and Infrared Atmospheric Sounding Interferometer (IASI) are capable of being assimilated operationally. MWIR radiance observations are not currently assimilated because of perceived problems resulting from effects of non-Local Thermodynamic Equilibrium (non-LTE), and solar radiation reflected by clouds and the surface, on these channels. These factors are easily accounted for in the radiance assimilations mode of the present invention by the methods herein described.

Climate Processes and Climate Change: Water Vapor and Precipitation

It is to appreciated that weather and climate processes are intimately linked by water vapor. Accurate knowledge of the distribution of water, retained within the atmosphere, is indispensable to predicting the amount, the time, and the location of precipitation. Recent studies by the National Research Council (NRC) and the Intergovernmental Panel on Climate Change (IPCC) showed that the Earth's climate can undergo changes in response to increasing concentrations of greenhouse gases and aerosols, and that these changes may profoundly affect atmospheric water vapor, clouds and precipitation patterns.

Observations of these changes, achieved by the present invention, with regard to the distribution and dynamic behavior of water vapor in the coming years will further quantify the relationship between the concentrations of greenhouse gases and environmental phenomena with the greatest impact on human society, ranging from severe drought or severe storms and thereby improving the ability to forecast the impact of these changes in the most policy-relevant terms.

The high-frequency measurements, as contemplated by the present invention, are especially important for characterizing these relationships and noting potential changes in dynamic weather events or diurnal convective processes. Recently, the assimilation of AIRS radiances into a regional atmospheric model has shown to improve the accuracy of precipitation likelihood. According to the present invention, the improvements of both spatial and temporal sampling densities create a synergistic effect upon these capabilities.

Figure 3:
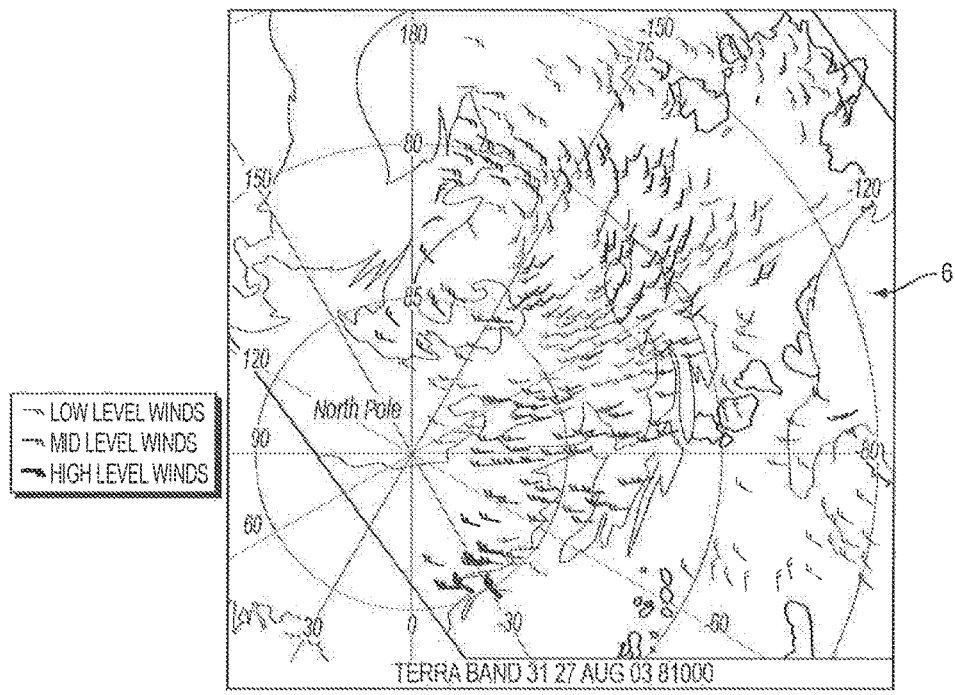
FIG. 3 is a schematic drawing showing that a first constellation embodiment, according to the present invention, which will provide higher vertical resolution winds than MODIS.

A Relevancy Scenario: 3D-Winds with Simultaneous Atmospheric State Observation-Together with Pollution Transport Pathways Studies Turning now to FIG. 3, which is a schematic drawing showing that the constellation 6, according to the first embodiment of the present invention, which will provide higher vertical resolution winds, than Moderate Resolution Imaging Spectroradiometer (MODIS). That is, infrared sounders of the current generation have proven valuable in understanding the processes affecting water vapor transport and cloud formation in the atmosphere over somewhat longer time-scales. The new capability, provided by the present invention, provides a powerful constraint on global circulation models (GCMs) by simultaneously observing both its current state, and rate of change with high spatial resolution and vertical resolution.

Several infrared spectral soundings, each having high spatial and vertical resolution, are observed over a given region by the three micro-satellites 4' of the first constellation 4 according to the present invention system. These three micro-satellite 4' flying or orbiting in formation so as to provide a triplet of sequential observations that can then be used to measure, at different pressure altitudes, both cloud motion-vector winds (CMVW) and moisture motion-vector winds (MMVW), with an approximate vertical resolution of 50 mb through the troposphere. In addition, each of these observations provides near AIRS-quality vertical profiles of the temperature and the moisture, (atmospheric state) for the same atmospheric column.

The second constellation 6 of twelve micro-satellites 6' (only three of which are visible in FIG. 2), comprise four separate orbital planes each with a 3-satellite formation would provide vertically resolved tropospheric winds and atmospheric state measurements globally every 3 hours. It is believed that these observations would have an unprecedented impact on short-term numerical weather forecasting. In addition to these weather forecast-oriented improvements, the system and method, according to the invention, will fundamentally improve pollution transport research as well.

Figure 4:
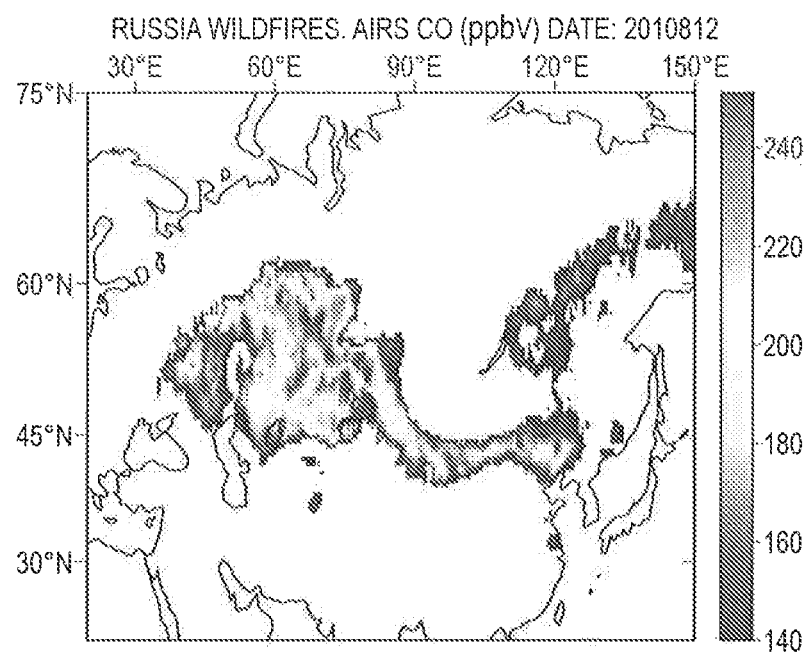
FIG. 4 is a graph showing observations of CO which will illuminate pollution moving along transport pathways.

FIG. 4 is a graph showing observations of CO, according to the present invention, which will illuminate pollution traveling along transport pathways. According to one embodiment of the present invention, simultaneous observations of CO, together with other constituents of air pollution, can be utilized in order to illuminate pollution moving along various transport pathways. For example, CO may be used as a tracer species and this information may be used further in transport studies.

According to another aspect of the invention, a spectral range is selected which captures strong absorption/emission bands of both CO and $N_2O$, allowing these to be readily observed in a vertically resolved fashion. While extremely advantageous in its own right, this transport observation capability would be highly complementary to observations planned for NASA missions GACM, ASCENDS and PACE. Regardless of the complementary techniques employed, the system and the method according to the present invention provides a fundamental tool for understanding atmospheric transport mechanisms and processes.

General Approach

The societal value of fundamental measurements of the atmosphere, including the vertical temperature and moisture profiles and related characteristics, have long been recognized for their value in ongoing fundamental research, for the supporting data they provide for new research missions, and their value for operational earth observations for weather forecasting and other applications.

However, the programmatic difficulties experienced with National Polar-orbiting Operational Environmental Satellite System (NPOESS) and the Geostationary Operational Environmental Satellite R-Series Program (GOES-R) program are traceable, in part, to the spiraling complexity and cost associated with development of large instruments and multi-payload platforms such as NPOESS and GOES-R. For at least these reasons, NASA and other space agencies are exploring the use of distributed observing system architectures for various environmental observations.

The driving technical challenges arise from the need to provide observations of the required data quality while also fitting within the severe payload accommodation constraints of an economically favorable distributed architecture. The Inventors have found through extensive studies of the requirements for thermal infrared spectral sounders that the driving accommodation requirements are achieving properly controlled payload thermal environments for the spectrometer and the detectors—so as to support the needed spectral radiance data quality within the resource constraints of a satellite.

Technical Approach for the Instrument

The approach, according to the present invention 2, meets the driving thermal challenges of providing high vertical resolution temperature and humidity sounding observations, via various micro-satellites 4', 6' for example, using a four-fold approach:

Employing a dramatically reduced spectral range enabled by advances upon the AIRS Team technology, using spectral channels that place the lowest thermal demands on the payload while providing the greatest vertical resolution;

Employing a new MWIR FPA (Focal Plane Assembly) technology based on Avalanche Photodiodes, whose intrinsic photo-signal gain and low noise figure allow much higher detector operating temperature;

Employing a novel cooled infrared spectrometer whose optomechanical thermal design presents the least thermal load and requires the least platform resources: and Selecting spectral bands, within a system-of-systems context, to avoid replication of observation capability in the invention that exists elsewhere in the system of systems.

Advances in infrared sounding science and algorithms, under the AIRS program, enable the use of just the 1950-2450 cm−1 range. In the region dominated by $CO_2$ absorption, the present invention adapts the AIRS approach and now successfully addresses the challenges of solar reflectance contamination effects, non-local thermal equilibrium effects when deriving a level-2 vertical temperature profile product from channels within this range. That is, the system and the method, according to the present invention, uses water vapor absorption lines in the 1950-2325 cm−1 range, rather than the 1333-1660 cm−1 range that is used by the AIRS approach. The change in wavelength analysis, according to the present invention, thereby enables a consolidated MWIR spectral band for use in a single spectrometer. The key proposed instrument characteristics, of the present invention, are shown in Table 1.

TABLE 1

| Characteristic | Value | Comments |
|---|---|---|
| Key Instrument Performance Characteristics | | |
| Minimum Spectral Frequency | 1950 cm$^{-1}$ | 5.128 mm |
| Maximum Spectral Frequency | 2450 cm$^{-1}$ | 4.082 mm |
| Spectral Sampling | 2.1 nm/sample | ~500 spectral samples |
| Spectral Resolution @ minimum | 1.7 cm$^{-1}$ | Resolves Multiple H2O Lines |
| Spectral Resolution @ maximum | 2.3 cm$^{-1}$ | Comparable to AIRS |
| Spectral Calibration Knowledge | 1/100,000 | dl/l |
| Angular Sampling | 1.64 mr (cross-dispersed) | 1.15 km (@ nadir) |
| Orbital Altitude and Orbit | 705.3 km | Polar/Sun-Synchronous |
| Angular Range | 1570 radians | 90 degrees |
| Spatial Resolution | <3 km (geometric mean) | @ nadir |
| Radiometric Sensitivity | <200 mK | (<150 mK @ 4166 cm−1) |
| Radiometric Accuracy | <1% | @ 300K Scene Background |

TABLE 1-continued

| Characteristic | Value | Comments |
|---|---|---|
| Anticipated Level-2 Data Product Characteristics, for Primary Data Products | | |
| Vertical Resolution-Temperature | ~1 km | Lower Troposphere |
| Layer Accuracy | ~1.25K | Lower Troposphere |
| Vertical Resolution-Humidity | ~2 km | Lower Troposphere |
| Layer Accuracy-Humidity | ~15% | Lower Troposphere |

The second key attribute, according to the present invention, is that the instrument design is that the baselined Infrared Focal Plane Array detector (IRFPA) and operates at an elevated temperature, relative to other MWIR hyperspectral instruments at this resolution, for the expressed purpose of reducing the required active cooler power. A suitable elevated temperature is, for example, between 90° K and 100° K.

Figure 5:
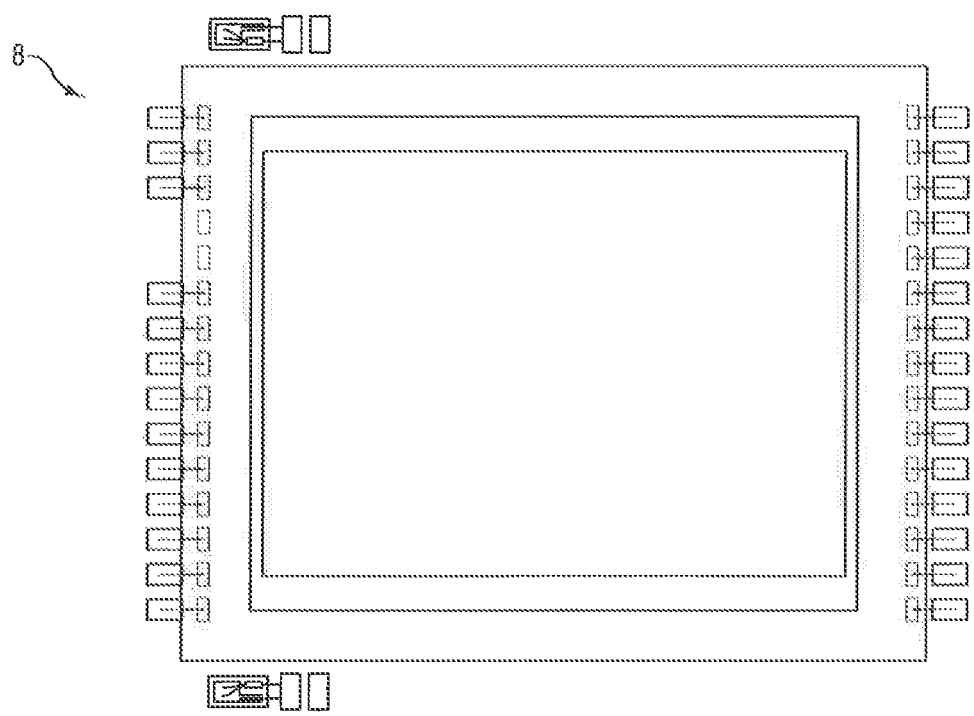
FIG. 5 is a front elevational view of the MWIR HgCdTe avalanche photodiode-based IR focal plane array detector for use with the present invention.

FIG. 5 is a diagrammatic planar view of the MWIR HgCdTe avalanche photodiode-based IR focal plane detector 8, for use with the present invention. In this embodiment, the Infra Red Focal Plane Assembly (IRPFA) is composed of a 640×480 HgCdTe Avalanche Photo-Diode (APD) detector and a Complementary Metal-Oxide-Semiconductor Read Out integrated Circuit (CMOS ROIC). As shown in FIG. 6C, a pulse tube microcooler assembly 48 is thermally coupled to the detector 8 to provide active cooling of the detector 8 during operation. A remainder of the components of the miniature cooled spectrometer 10 are coupled to a radiator 46, in a conventional manner, for passively cooling of the same. As noted above, the detector 8 has a sensor which measures 640 pixels by 480 pixels and the detector 8 is arranged at the imaging plane of the spectrometer 10 for receiving and detecting the focused light.

The MWIR HgCdTe avalanche photodiode-based IR focal plane detector 8 allows high-sensitivity hyperspectral measurements, which are especially required for the weak emission from $CO_2$ in the upper troposphere while still operating at a relatively warm temperature of ~90-100° K. It is to be appreciated that the warm operating temperature of the detector 8 minimizes the load on the pulse tube microcooler assembly 48, and thus allows the detector 8 to operate in a much more efficient range—a virtuous cycle.

A similar Avalanche Photo-Diode has per-formed exceptionally well in operational context in a classified airborne SWIR hyperspectral imaging mission for 1½ years. According to the present invention, the detector 8 uses a Cd mole fraction which gives the detector 8 an MWIR band gap, such that its electronic band structure supports an avalanche gain of more than 100×, at a noise figure<1.4.

To meet radiometric sensitivity requirements, this IRFPA can be operated at a temperature as high as 100° K which is 25° K higher than an IRFPA not employing photo-signal gain. Crucially, the selected Next Generation Space Telescope (NGST) miniature pulse-tube cooler has a specific cooling power of ~20 W/W at 100° K-1.8× which is better than the 36 W/W required at ~75° K (or lower) more typically needed for this sensitivity level.

Thermal models for cry-packaged IRFPAs of the present invention, validated on AIRS and other efforts, predict a total load (active FPA and passive conductive and radiative loads) on the cryo-cooler cold-tip of ~750 mW at 100° K, for a total cryo-cooler power of ~15 W (which is 10× lower than the prior art instrumentation).

The third key attribute of the instrument design, according to the present invention, is the manner in which the design minimizes the thermal accommodation requirements. Specifically, the present invention employs a novel spectrometer opto-mechanical/thermal design that minimizes the total thermal load of the spectrometer 10.

Figure 6A:
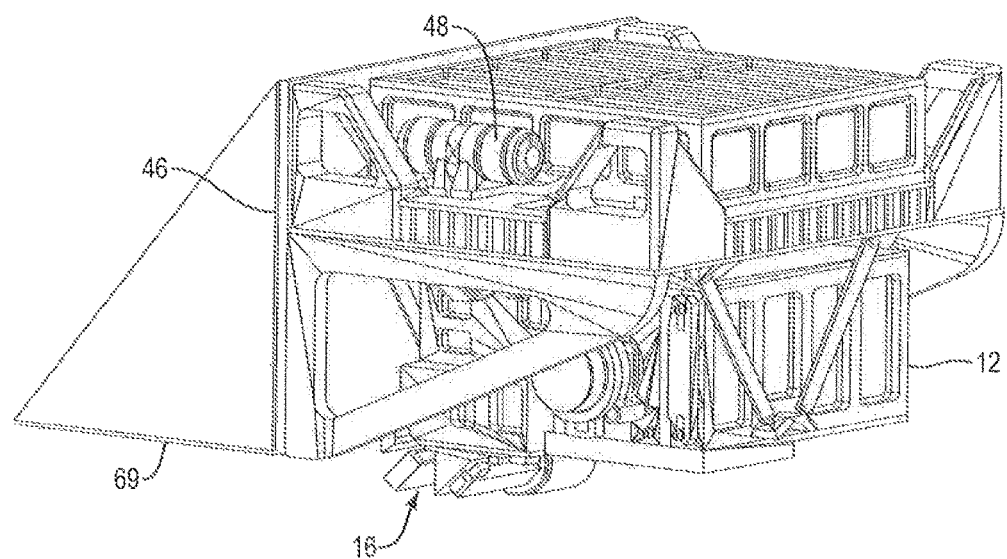
FIG. 6A is a diagrammatic top, front, right side perspective view of a miniature cooled spectrometer according to the present invention.
Figure 6B:
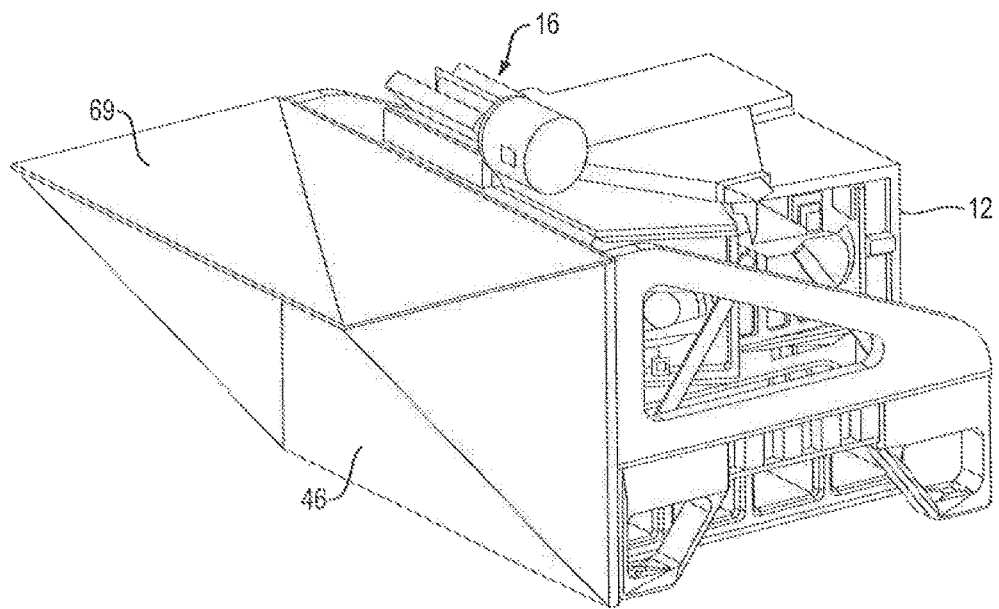
FIG. 6B is a diagrammatic bottom, rear, left side perspective view of the spectrometer of FIG. 6A.
Figure 6C:
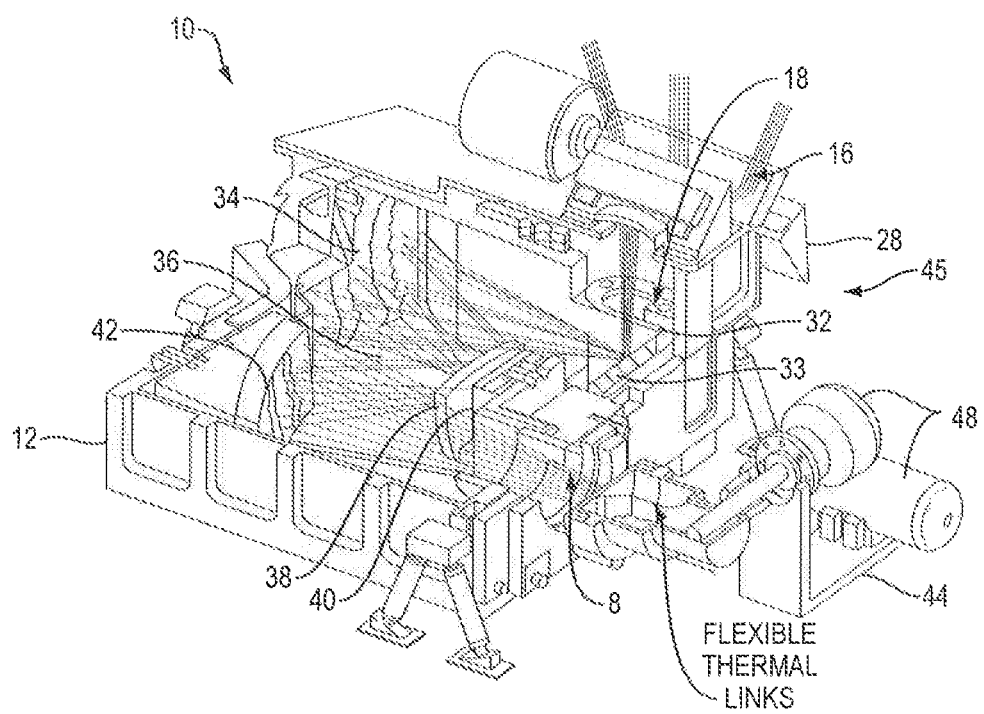
FIG. 6C is a diagrammatic bottom view, with a portion of the exterior housing removed, showing the optics of the spectrometer of FIG. 6A.

Turning now to FIGS. 6A, 6B and 6C, these drawings show the miniature cooled spectrometer 10, according to the present invention, which is designed and jointly optimized for a high operating temperature, a high throughput and low self-emission. It is noted that a portion of the exterior housing 12 (e.g., the baffle and the cover) is partially removed, from FIG. 6C, in order to show the interior optical components of the spectrometer 10 as well as the ray traces/light paths though the spectrometer 10 for detection by the detector 8. The light that is directed away from the earth 14 and toward the spectrometer 10 is initially reflected by a reflective rotatable mirror 16 (FIGS. 6A, 6B and 6C) which is located outside of the housing 12 of the spectrometer 10 and reflects 100% of the received light towards the fore optics lens 18 of the spectrometer 10. The fore optics lens 18 comprises a fore optics flat mirror which reflects the light toward a fore optics convex mirror which, in turn, reflects the light toward a fore optics convex mirror which finally reflects the light toward a slit block 32.

The reflective rotatable mirror 16 permits the spectrometer 10 to scan across a viewing area 20 (from left (e.g., east or south) to right (e.g., west or north) or right (e.g., west or north) to left (e.g., east or south)) of the earth 14 and gather data as the micro-satellites 22, 22' or 22", containing the spectrometer 10, orbits around the earth 14. A typical scan of the viewing area 20 (see FIG. 10D), by the spectrometer 10 of the respective satellite 22, 22' or 22", from a first lateral edge 24 of the viewing area 20 to an opposite second lateral edge 26 of the viewing area 20, takes approximately about 80-120 seconds or so. Thereafter, the rotatable mirror 16 will then eventually rotate back to its initial scan position in order to commence another scan of the viewing area 20, but this time of a next sequentially section of the viewing area 20' (see FIG. 10D) along the orbital path of the satellite 22, 22' or 22". Since the satellite 22, 22' or 22", carrying the spectrometer 10, has orbited relative to the earth 14 for a time period of approximately about 80-120 seconds, the satellite 22, 22' or 22" is thus now located at a different position relative to the earth 14. However, before the spectrometer 10 commences another scan of the viewing area 20, the rotatable mirror 16 may be rotated to a position in which the spectrometer 10 views a completely black surface of a calibration assembly 28 to facilitate calibration of the spectrometer 10. In addition, the rotatable mirror 16 may also possibly be rotated to a position(s) where the spectrometer 10 is permitted to briefly view outer space before returning back to its initial scan position and commencing another scan cycle of the viewing area 20.

According to one embodiment, the reflective rotatable mirror 16 will scan the viewing area 20, e.g., from −45 degrees (relative to nadir) to +45 degrees at a constant scan rate which typically takes approximately 82 seconds. Thereafter, the reflective rotatable mirror 16 will take approximately 1 second to transition to an angle for a deep-space reference (e.g., 70 degrees off nadir) and be permitted to scan deep space at constant rate for approximately 1 second (typically at the same scan rate used for scanning the viewing area 20). Next, the reflective rotatable mirror 16 will then take approximately 1 second to transition to an angle (perhaps 90 degrees off nadir) for viewing of the black surface of the calibration assembly 28 to recalibrate the spectrometer 10. The reflective rotatable mirror 16 will then take approximately 1 second to view the calibration assembly 28 and recalibrate the spectrometer 10. Lastly, the reflective rotatable mirror 16 will take approximately 2 second to transition back to its initial scan position, e.g., −45 degrees (relative to nadir), in preparation for its next scan of the viewing area 20 and hypercube collection.

Figures 10A, 10B, 10C:
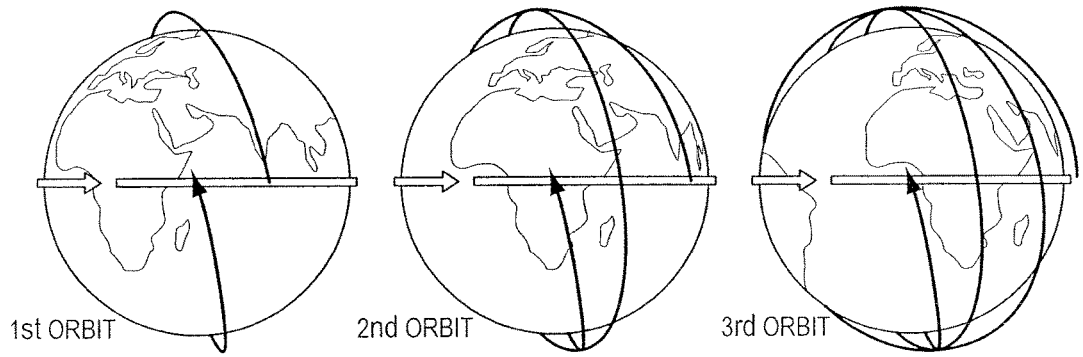
FIG. 10A is a diagrammatic schematic view showing the orbital path of a satellite, according to the present invention, as this satellite completes one orbit about the earth.
FIG. 10B is a diagrammatic schematic view showing the orbital path of a satellite as this satellite completes two sequential orbits about the earth.
FIG. 10C is a diagrammatic schematic view showing the orbital path of a satellite as this satellite completes three sequential orbits about the earth.
Figure 10D:
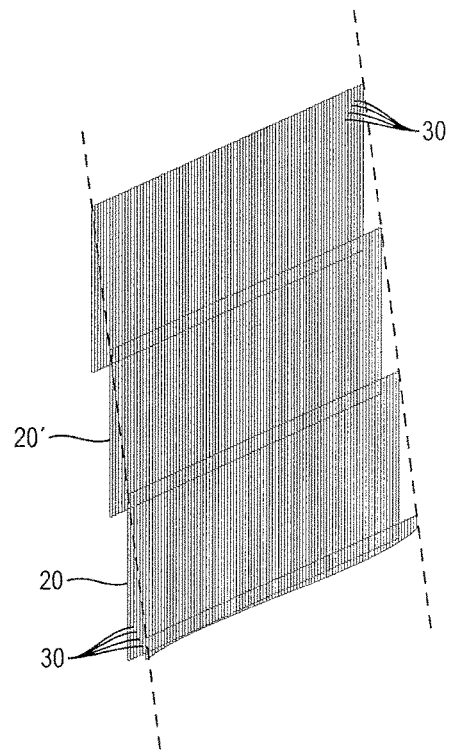
FIG. 10D is a diagrammatic schematic view showing a typically viewing area for each satellite, according to the present invention, as well as a typical view of field of the spectrometer as the spectrometer scans from a first longitudinal edge of the viewing area to an opposed second longitudinal edge of the viewing area.

As is conventional in the art, the spectrometer 10 has a field of view 30, which is diagrammatically shown in FIG. 10D as a very narrow line, there are a plurality of very narrow lines (e.g., 640) that are closely positioned adjacent one another and extend from the first lateral edge 24 of the viewing area 20 to the opposite second lateral edge 26 of the viewing area 20. As the rotatable mirror 16 scans from the first lateral edge 24 to the opposite second lateral edge 26, the field of view 30 of the spectrometer 10 is, in turn, correspondingly incrementally moved so that the spectrometer 10 gradually scans across the viewing area 20 from the first lateral edge 24 to the opposite second lateral edge 26 of the viewing area 20 of the spectrometer 10.

Due to the orbiting speed of the mirco-satellite 22 carrying the spectrometer 10, the scan path of the viewing area 20 by the spectrometer 10 is generally diagonal (diagonally to the right as shown in FIG. 10D). If the reflective rotatable mirror 16 rotated from right (e.g., west or north) to left (e.g., east or south), instead of left (e.g., east or south) to right (e.g., west or north), then the scan path of the viewing area 20 by the spectrometer 10 would be diagonal to the left.

When the rotatable reflective mirror 16 is again finally rotated back to its initial scan position to commence another scan, the spectrometer 10 is then suitably positioned to scan the next sequential section of the viewing area 20' (see FIG. 10D), due to the orbiting speed of the micro-satellite 22 carrying the spectrometer 10. The above described process is continuously repeatedly multiple times each hour as each one of the micro-satellite 22, 22', 22", each carrying a respective spectrometer 10, orbits around the earth 14.

It is to be appreciated that the rotatable reflective mirror 16 only reflects the light from the earth 14, which falls within the field of view 30 of the spectrometer 10, toward the fore optics lens 18 of the spectrometer 10 (e.g., type F#/3) which has a focal length of 15 mm. The fore optics lens 18 focuses the light as an image on a slit focal plane located inside the spectrometer 10 and a slit (not shown in detail) of the slit block 32 is located coincident with the slit focal plane. The slit block 32 receives the focused light, from the fore optics lens 18, and the slit of the slit block 32 only permits a very thin slice of the focused light, e.g., 1 pixel wide×480 pixels long, to pass through the slit of the slit block 32 and propagate toward the remaining components of the spectrometer 10 while the slit block 32 absorbs and prevents a remainder of the focused light from passing through the slit block 32. After the focused light, which is permitted to pass through the slit block 32, exits from a rear surface of the slit block 32, the focused light rays commence expansion until those light rays eventually impinge upon a reflective surface of a fold mirror 33.

The focused light rays are reflected by the first fold mirror 33 toward a second (concave) mirror 34. The reflected light rays continue to expand until the light rays eventually impinge upon a reflective surface of the second (concave) mirror 34 of the spectrometer 10. The expanding light rays are then reflected and refocused, by the reflective surface of the second (concave) mirror 34, toward a combined lens/grating component 36. The combined lens/grating component 36 comprises a dispersive/magnifier lens 38 which is located directly in front of a diffraction grating 40.

The light rays, reflected by the second (concave) mirror 34, then pass through the dispersive/magnifier lens 38, of the combined lens/grating component 36, and the light rays are slightly magnified as they pass through the dispersive/magnifier lens 38, Thereafter, the light rays impinge against an exterior surface of the diffraction grating 40 located directly behind the dispersive/magnifier lens 38. Each of the magnified light rays, upon impinging against the exterior surface of the diffraction grating 40, are diffracted and the amount of diffraction is directly related to the wave length of each of the light rays impinging upon the diffraction grating 40 as well as the contour of diffraction grating 40. Such diffraction of the light rays thereby creates a spectral dispersion of the light received from the second (concave) mirror 34. This spectral dispersion of the light rays then passes through and exit from the dispersive/magnifier lens 38 and propagate toward a third mirror 42 of the spectrometer 10. The third mirror 42 then receives the spectral dispersion, from the combined lens/grating component 36, and reflects and images the spectral dispersion toward the detector 8, such as a detecter dewar thermal link, detector dewar and the FPA which typically operates at a temperature of approximately 100° K.

The detector 8, of the spectrometer 10, typically operates at a click rate of 30 per second so that over the course of one complete scan (from the first lateral edge 24 to the opposite second lateral edge 26) consuming approximately 82 seconds, the detector 8 will collect approximately 2460 (30×82) separate images of data of the viewing area 20 which are all then utilized and compiled with one another to form a 3D image of the view area 20. It is to be appreciated that the light that is directed away from the earth 14 and toward the spectrometer 10 is initially reflected by the reflective rotatable mirror 16 and then eventually separated, by the optics of the spectrometer 10, into two bands of light, namely, a second order band and a third order band. The second order band of light is propagated toward the first region of the detector 8 (which typically measures 340 pixels by 480 pixels) while the third order band of light is propagated toward a second region of the detector 8 (which typically measures 243 pixels by 480 pixels). An inactive region (which measures 57 pixels by 480 pixels) is located between and separates the first and the second regions of the detector 8 from one another. The different colors of light of the spectral dispersion of the light are then detected by the various spectral channels of the detector 8 located in either the first or the second regions of the detector 8 in a conventional manner.

The present invention generally utilizes a modified Offner spectrometer 10 which has 500 spectral channels, 480 spatial channels, 2.2 nm/pixel, and 25 um Pixels. The midwave infrared sounding readings, detected by the detector 8, are then utilized to determine temperature—wind vector map by slicing the optical band pass into 640 slit images of different color shades, 583 of these images are utilized in order to create moisture/vertical position resolution.

This specialized Offner also has a low-mass electroformed cold thermal baffle 44, a black interior and a gold exterior, that is cooled to 195° K by the relatively small passive radiator 46 while a remainder of the optics operate at a warmer temperature. This cold thermal baffle 44 encompasses in part the pulse tube microcooler assembly 48. The cold shield 49 creates a cold background thereby reducing noise of the spectrometer 10 and improving upon the collection of data. Additional components of the modified Offner spectrometer 10 include aluminum optics, the combined lens/grating component 36, the housing 12 cooled to at around 200° K, a cold shield Thermal I/F 49, the pulse tube microcooler assembly 48, the cold thermal baffle 44, and a MLI 45.

The basic format for the spectrometer 10 design was initially developed to enable rapid cooling of the spectrometer 10 in an air-borne LWIR hyperspectral imaging application. Those specific and favorable characteristics of the spectrometer 10 for the invention are listed in Table 2, in comparison with a prior art small Dyson-class spectrometer 10 with the same spectral range and resolution. Specifically, Table 2 is an assessment of candidate MWIR spectrometer 10 implementations for the present invention. As Table 2 illustrates, the modified Offner is superior in this case because it enables lowest cooler power and warmest temperatures. Small overall instrument resource use is most essential-overall size, mass, and power.

TABLE 3

| Instrument Element | Power (W) | Mass (Kg) |
|---|---|---|
| Spectrometer Assembly | — | 4.5 Kg |
| Detector/Dewar/Cooler | 15 W (+5 control) | 1.2 Kg |
| On-Board Calibration Source | 1 | 0.2 |
| Spectral Data Handling Electronics | 8 | 1 |
| Payload Structure and Radiators | 3 | 3.5 |
| Miniature Scan Mirror/Control | 2 | 1.3 |
| Instrument controller | 1 | 0.2 |
| Instrument Power Converter | 5 | 0.1 |
| Payload Total | 40 W | 12 Kg |
| (Initial Design Margin) | (10 W) | (3 Kg) |
| A100 Payload Allocation | 50 W | 15 Kg |

TABLE 2

| Dispersion Device Characteristics | Instrument Implications | Primarily Reflective (Mod. Offner-Type) with Electro-formed Baffle | Primarily Refractive (Dyson Type) |
|---|---|---|---|
| Optical Throughput Efficiency | Higher Throughput ⇒ Higher Detector Temp (Low Power) | 99% | 75% |
| Exposed Aft-Optics Solid Angle (after dispersion) | Lower solid angle ⇒ higher temp. (Smaller Cryo-rad.) | ~0.3 str | ~1 str |
| Spectrometer Temperature | Higher Temp ⇒ Smaller Cryo-Radiator | <195K | <175K |
| Spectrometer Alignment | Warm Alignment ⇒ Lower Integration Costs | Can be Aligned Warm | Cold Alignment Needed |
| Supported Cold Mass/Size (Relative) | Lower Mass/Size ⇒ Smaller Cryo-Radiator | Mass = 0.1, Size = 1 | Mass = 1, Size = 1 |
| Total Relative Mass/Size | Smaller ⇒ Lower Mass | Mass = 1, Size = 2 | Mass = 1, Size = 1 |

Figure 7:
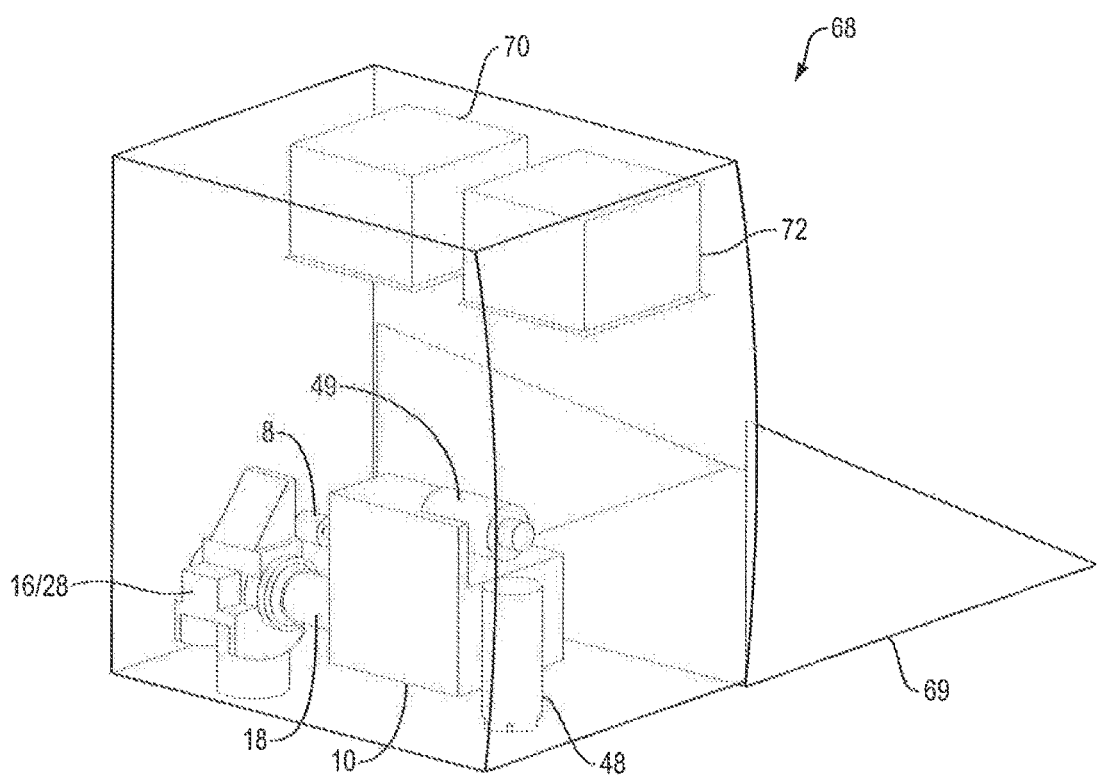
FIG. 7 is a diagrammatic perspective view of some of the major components of a payload, according to the present invention.

Turning next to FIG. 7, this figure illustrates a diagrammatic perspective view of the major instrument components of a payload 68 of the invention 2 with earth shield 69 deployed and the remainder of components enclosed in the radiator face.

As shown here, the secondary dimensions of the payload 68 are in a range from about 20.75"×18.75"×15". This ensures that the secondary volume of the payload 68 is preferably is about 5,835.94 in$^3$. There are two 3 U electronics boxes 70, 72. The first 3 U electronics box 70 carries the power control and CMD/CNTRL and FPA Cntrl Elex. The second 3 U electronics box 72 contains at least the crycooler electronics, and the processor and data storage. The pulse tube microcooler assembly 48, the scan mirror, the calibration assembly 28, NADIR (Vector normal to earths surface), the spectrometer fore optics 18, FPA, Dewar, and cold finger I/F are all adjacent the IR spectrometer 10.

The spectrometer 10, the detector 8 and its thermal control elements, such as the thermal baffles, are the largest and most power intensive portions of the payload 68. The remaining elements of the payload 68 are listed, together with power and mass allocations in Table 3 below, where the estimated totals are compared with the payload estimates for proposed mirco-satellites 22, 22', 22", the A100 bus from Aerospace Company (ATK). As shown here, the size, the mass, and the power requirements, as well as passive cryoradiator arrangements, when reviewed with small SC supplier, are in a typical range for the A100, as one spacecraft example.

In addition to using a highly efficient approach for the spectrometer 10, the on-board spectral data handling employs an FPGA-based processing chain to minimize power needed for transient gamma ray effects mitigation, sub-frame aggregation and formatting/encoding computations.

The fourth key attribute of the present invention is that it employs other observations to supplement observations for the Level 2 product generation rather than adding functionality, cost and complexity. For infrared sounding spectroscopy, spectral channels in the LWIR window and 15 mm $CO_2$ emission bands can be used together with the data to better-identify the presence of partial cloud-cover in a sounded region, or to determine cloud phase, or to (better) observe ozone concentration. Specifically, the GOES-R ABI and MSG and planned MTG multi-spectral imagers as well as the SOUMI and JPSS-hosted VIIRS (Visible Infrared Imaging Radiometer Suite) instruments will provide high spatial resolution/multi-spectral observations of detailed cloud characteristics and ozone ($O_3$). The ABI will provide global refresh with 5-15 min refresh rates. The Cross-track Infrared Sounder (CrIS) and IASI (and ongoing AIRS) high spectral resolution measurements in the LWIR provide information on the stratospheric temperature and humidity vertical profiles.

In turn, the present invention provides rapid refresh/high spatial resolution observations of CO and $N_2O$ in the troposphere superior in spatial resolution and refresh to those provided by other observing platforms, in addition to its vertical temperature and water vapor profile observations.

Operational Considerations

Preferably the apparatus of the invention will be compatible with launch as a secondary payload, attached to the Small Secondary Payload Adapter (8-inch bolt circle) on vehicles as small as the Minotaur IV with Standard Faring. FIG. 6A generally shows the apparatus, stowed for launch, attached to an adapter ring. It is meant to be used as part of an observing constellation, where the configuration of the constellation is tailored to the specific environmental data product set sought. Some options for data product and the constellation approach to support product acquisition are shown in Table 4. Listed are two missions where three micro-satellites 22, 22', 22" are used to collect triplet image sets where spatial correlation measurements reveal layer-by-layer movement of the atmosphere. The third envisions either radiance assimilation, or vertical profile assimilation into an NWP model.

94", 94"' with each cluster 94, 94', 94", 94"' comprising three separate satellites 22, 22', 22". As noted above, it is to be appreciated that as few as one cluster and as many as 6 or more clusters may be employed, depending upon the refresh rate, e.g., 2 to 12 hours, desired by the method and system according to the present invention.

Each cluster 94, 94', 94", 94"' of three micro-satellites 22, 22', 22" functions primarily as discussed above with respect to other embodiments. That is, as each satellite 22, 22', 22" orbits around the earth 14, the field of view 30, of the spectrometer 10 incorporated as part of the micro-satellite, scans from west (left) to east (right) or from east (right) to west (left), across the viewing area 20 while the micro-satellite 22 orbits from north to south or from south to north (or possibly from east to west or from west to east), so as to obtain hypercube information from each micro-satellite 22, 22', 22" over a viewing area 20 of about 1500-1800 km, for

TABLE 4

| Mission Objective | Data Product Objective | Constellation Approach | # Payloads |
|---|---|---|---|
| Tropospheric Winds Observation (Prototype Operational Vertically Resolved Winds and Atmospheric State Observation | Fine Vertical Resolution 3-d Winds Products (Cloud and Moisture Motion Vector Winds) with Sounding Products | Observations by each of 3 instruments spaced by ~10 to 30 min. (same orbital plane | 9-12 |
| Rapid Refresh Temperature/Humidity Profile Observation (Prototype Operational Weather Observation) | Separately Acquired Infrared Spectral Radiances, for Assimilation into Regional Weather Models | Independent observations by platforms in sun-synchronous orbits with nodal crossing times spaced by 90 minutes | 8 |
| Secondary Transport Observation (e.g. supporting a GACM or PACE Primary NASA Mission) | Multi-level wind vector data co-incidentally collected with primary mission/trace chemical total column observations | Observations by each of 3 instruments spaced by ~10 to 30 min (same orbital plane as primary payload) | 3 |

Approximate launch costs per secondary payload (micro-satellite 22, 22', 22"), using this approach, is believed to be on the order of $2 million or less for each micro-satellite 22, 22', 22". As a consequence, launch costs of the entire constellation would be much less than the cost of launching a satellite for the GEO orbit. FIG. 7 shows the major payload elements, with the envelope allowed for a secondary payload using the Small Secondary Payload Adapter Ring on a Minotaur IV vehicle (with Standard Faring). As another option, a future DMSP (Defense Meteorological Satellite Program) launch could be used to launch one or more satellites 22, 22', 22", carried aboard its planned ESPA (Evolved Secondary Payload Adapter) ring. Overall launch and mission costs will depend on several factors-including the type of observation (Winds Measurement, or Rapidly Refreshed Atmospheric State) selected. The first (and third) options are most amenable to launching multiple apparatus—bearing spacecraft into the same orbital plane, to be separated into the wind-observation formation at low energy cost. The second mission type requires multiple orbital planes, and orbiting the full constellation would require some combination of multiple launches, passive, and active orbital plane changes to fully deploy.

Additional Potential Benefits and Commercial Potential

Figure 8A:
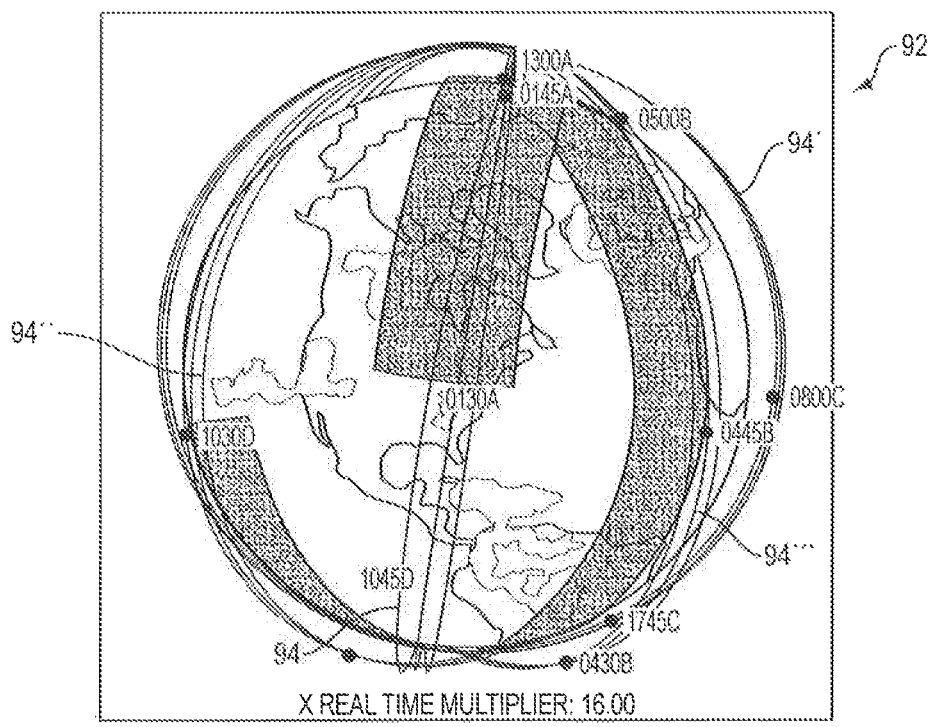
FIG. 8A is a schematic illustration of a second constellation embodiment according to the present invention.
Figure 8B:
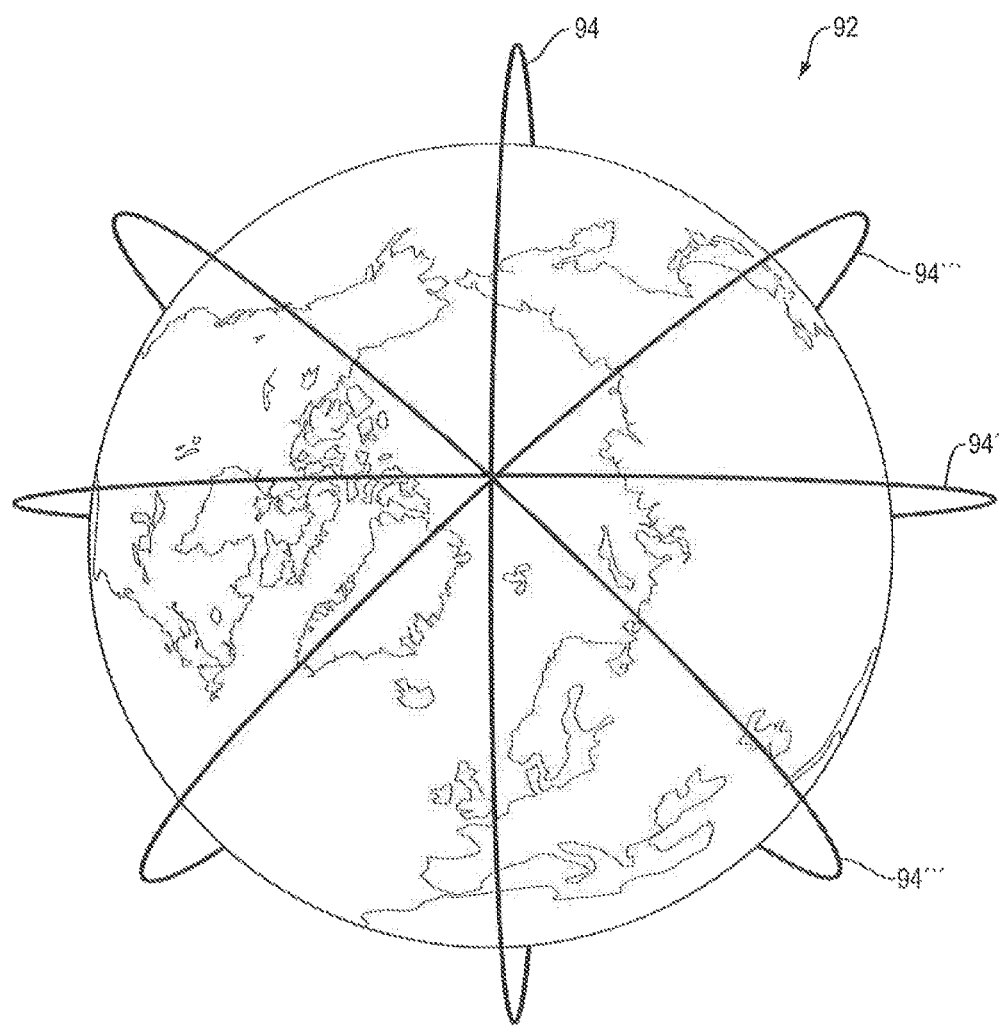
FIG. 8B is a diagrammatic schematic view of the constellation embodiment of FIG. 8A, from outer space, generally showing the orbital paths of the four separate clusters as the four clusters orbit around the earth.

Turning now to FIGS. 8A and 8B, a pair of schematic drawings showing a further embodiment of the present invention will now be described. According to this embodiment, several infrared spectral soundings, with high spatial and vertical resolution, are observed over a given region by a constellation 92 comprising four separate clusters 94, 94', example. By suitably selecting the orbital speed of the micro-satellites 22, 22', 22", once the three micro-satellites 22, 22', 22" have completed one orbit, the earth 14 has sufficiently rotated on its axis so that the three micro-satellites 22, 22', 22" are all located to make another scanning pass over the surface of the earth 14 but, this time (see FIGS. 10A-10C), scan a different area of the earth 14.

It is also noted that each cluster 94, 94', 94", 94"' of three micro-satellites 22, 22', 22" is capable of providing a series of three separate observations/measurements to support vertically resolved motion vector winds observations every twelve hours as they rotate in their respective sun-synchronous polar orbits. Thus, using four separate clusters 94, 94', 94", 94"', each including three separate micro-satellites 22, 22', 22", the satellite constellation 92, according to the present embodiment, is thus able to provide global observations/measurements approximately every three hours.

According to this embodiment, as noted above, each of the four groups or clusters 94, 94', 94", 94"' comprises three separate micro-satellites 22, 22', 22" which fly or orbit in a predetermined formation so as to provide a triplet of observations/measurements. This observational trifecta can then be used to measure both cloud motion-vector winds (CMVW) and moisture motion-vector winds (MMVW) at different (pressure) altitudes, with an approximate vertical resolution of 50 mb through the troposphere. Each of these observations provides near AIRS-quality vertical profiles of the temperature and the moisture, (atmospheric state) for the same atmospheric column.

As previously touched upon, weather models make an observation using 6 or 8 vertical measurements. Adjustments are then made to the model to ensure that it is consistent with updated observations—thus data assimilation is coincident with constraining the model. In other words, weather models are a numeric modeling of the measurements of the weather related thermodynamic fields. Thus, the more constraints that are present, the better the representations become. Previously, temperature soundings have been performed with the global weather balloon network near the ground for very small localities while global information is gathered for temperature and moisture information only a few times a day in the upper air network.

The satellite constellation 92, according to the present invention, comprising between 1 to 6 or more separate clusters, provides finer atmospheric measurements so that it is possible for the respective spectrometers 10 to observe smaller changes on a smaller scale thereby resulting in improved spatial and temporal resolution on a global scale. Just one mirco-satellite 22, 22' or 22" can create hyper spectral imagery of water vapor, 3-D imaging using 2D arrays with 1D spatial information. Initially, each micro-satellite 22, 22', 22" gathers/observes information with respect to the section of the atmosphere which falls within the field of view 30 of the micro-satellite 22, 22' or 22", but due to the scanning ability of the micro-satellites 22, 22' or 22", the present system and method create a virtual hypercube globally.

Turning now to FIG. 8B, a constellation 92, as viewed from space generally vertically above the North Pole, comprises, for example, four separate spaced apart clusters 94, 94', 94", 94''' with each one of the four clusters 94, 94', 94", 94''' comprising a group or set of three separate micro-satellites 22, 22', 22" (not shown in detail in this Figure). Although the three separate micro-satellites 22, 22', 22" are not shown in FIG. 8B, the three separate micro-satellite 22, 22', 22" are clearly visible in FIGS. 8A and 9A-9F. As generally shown in FIG. 8B, each of the four clusters 94, 94', 94", 94''' are arranged so that their respective micro-satellites 22, 22', 22" orbit around the earth 14 in similar sun-synchronous polar orbits which are located approximately 705 kilometers from the center of the earth 14. As shown in FIG. 8B, the orbits of the second cluster 94', of three separate micro-satellites 22, 22', 22", are substantially perpendicular with respect to the orbits of first cluster 94 while the orbits of the third and the fourth clusters 94", 94''', of three separate micro-satellites 22, 22', 22", form an angle of about 45° with respect to both the first and the second clusters 94, 94' of the three separate micro-satellites 22, 22', 22". As a result of such arrangement, the respective orbits of each one of the first, the second, the third and the fourth clusters 94, 94', 94", 94''' are each arranged so as to form an angle of approximately 45 degrees with respect to one another. As noted above, if an additional cluster(s), e.g., a fifth cluster and/or a sixth cluster, as part of the constellation 92, then the adjacent clusters will form a smaller angle therebetween, e.g., either an angle of 36 degrees for five clusters or an angle of 30 degrees for six clusters. A further detailed discussion concerning the relationship of the three individual micro-satellites 22, 22', 22" of the first cluster 94 is provided below, but it is to be appreciated and understood that the three separate micro-satellites 22, 22', 22" of each of the second, the third, and the fourth clusters 94', 94", 94''', and possibly the fifth and/or sixth clusters, will each have a substantially identical arrangement and thus operate in a substantially identical fashion.

As shown in FIGS. 9A-9F, the three separate micro-satellites 22, 22', 22" of the first cluster 94 are shown orbiting, from south to north, generally over the North America along three separate and distinct orbital paths or orbits 96, 96', 96" as the earth 14 is rotating from east (e.g., left) to west (e.g., right) in these figures. Each one of the three micro-satellites 22, 22', 22", namely, the leading first micro-satellite 22 (diagrammatically shown as a triangle), the intermediate second micro-satellite 22' (diagrammatically shown as a circle), and the trailing third micro-satellite 22" (diagrammatically shown as a square), rotates in its respective sun-synchronous polar orbit but, according to the present invention, the respective orbits are (longitudinally or possibly latitudinally) offset from one another by a small distance, the purpose of which will become apparent from the following description. In addition, the location of first micro-satellite 22, in its respective orbit 96, relative to the second and the third micro-satellite 22', 22", as well as the location of second micro-satellite 22', in its respective orbit 96' relative to the first and the third micro-satellite 22, 22" in their respective orbits 96', 96", is also staggered in a latitude (or possibly in the longitudinal) direction with respect to one another, the purpose of which will become apparent from the following description.

Figure 9A:
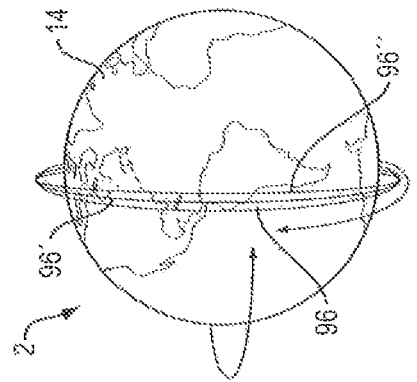
FIG. 9A is a diagrammatic schematic view generally showing the orbital paths of the three micro-satellite, of the first cluster, as the three satellite orbit around the earth.
Figure 9B:
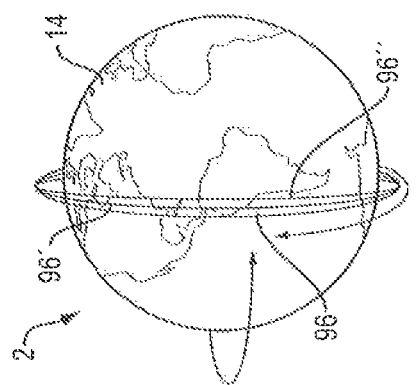
FIG. 9B is a diagrammatic schematic view, similar to FIG. 9A, generally showing the orbital paths of the three micro-satellite of the first cluster after an elapsed time of approximately 15 minutes.
Figure 9C:
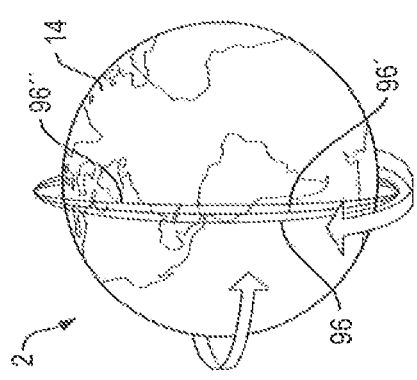
FIG. 9C is a diagrammatic schematic view, similar to FIG. 9A, generally showing the orbital paths of the three micro-satellite of the first cluster after an elapsed time of approximately 30 minutes.

As diagrammatically shown if FIGS. 9A-9C, the orbital paths of the leading first micro-satellite 22, the intermediate second micro-satellite 22', and the trailing third micro-satellite 22" each crisscross with one another generally at or near the North Pole and also crisscross with one another generally at or near the South Pole. As a result of such crisscrossing orbital paths 96, 96', 96", the leading first micro-satellite 22 is arranged to be the micro-satellite 22 which first gathers/observes data of a specific area while the trailing third micro-satellite 22" is arranged to be the last micro-satellite 22 of the cluster which gathers/observes data of that same specific area, as each of the three micro-satellites 22, 22', 22" orbit, e.g., from south to north, around the earth 14. In addition, due to such crisscrossing of the orbital paths 96, 96', 96" after the three micro-satellite 22, 22', 22" passing over the North Pole, the leading first micro-satellite 22 is again located to be the micro-satellite 22 which first gathers/observes data concerning a specific area of the earth 14 while the trailing third micro-satellite 22 is again located to be the last micro-satellite 22 of the cluster which gathers/observes data of that specific area, as the three micro-satellites 22, 22', 22''' orbit about the earth 14.

As the orbital paths 96, 96', 96" generally pass over the South Pole according to this embodiment, the orbital paths 96, 96', 96" of the three micro-satellites 22, 22', 22" again crisscross with one another so that the leading first micro-satellite 22 is again the micro-satellite 22 which first gathers/observes data while the trailing third micro-satellite 22" is the last micro-satellite of the cluster which gathers/observes data, as the three micro-satellite 22, 22', 22" again orbit from south to north. This process is continuously repeated each time the three micro-satellites 22, 22', 22" orbit around the earth 14. As is conventional in the art, it is to be appreciated that the orbital paths of each one of the three micro-satellites 22, 22', 22" may be periodically adjusted or alter in order to maintain each one of the three micro-satellites 22, 22', 22" in its desired position and orbit 96, 96', 96".

Figure 9D:
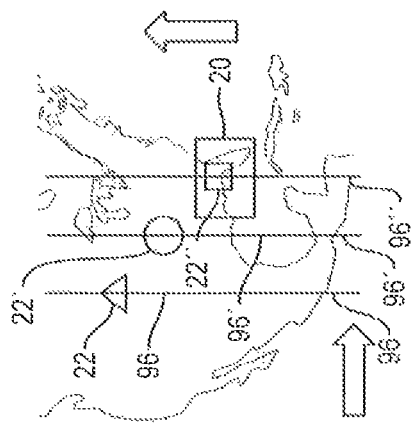
FIG. 9D is an enlarge diagrammatic view of FIG. 9A showing the orbital paths of the three micro-satellite of the first cluster with the first satellite positioned vertically above Tallahassee, Fla.

As diagrammatically shown if FIGS. 9A-9F and briefly discussed above, the leading first micro-satellite 22 is the first micro-satellite 22 to gather/observe data, as the three micro-satellites 22, 22', 22" orbit, e.g., from south to north, around the earth 14. As shown in FIG. 9D, the leading first micro-satellite 22 is diagrammatically shown as being directly located vertically above a specific area, e.g., Tallahassee, Fla. in this instance, so that Tallahassee, Fla. is located within the viewing area 20 of the leading first micro-satellite 22. Since the second and the third micro-satellites 22', 22" are both (longitudinally) offset and staggered (in the latitude direction) with respect to the leading first micro-satellite 22, Tallahassee, Fla. is not yet located within the viewing area 20 of either the second micro-satellite 22' or the third micro-satellite 22". According, as described herein, the first micro-satellite 22 operates to scan across its viewing area 20, i.e., either west (left) to east (right) or east (right) to west (left), and eventually Tallahassee, Fla. will fall within the field of view 30 of the spectrometer 10 of the first micro-satellite 22 so that the spectrometer 10 of the first micro-satellite 22 can then collect a first set of data/observations relating to the atmospheric conditions located above Tallahassee, Fla.

Figure 9E:
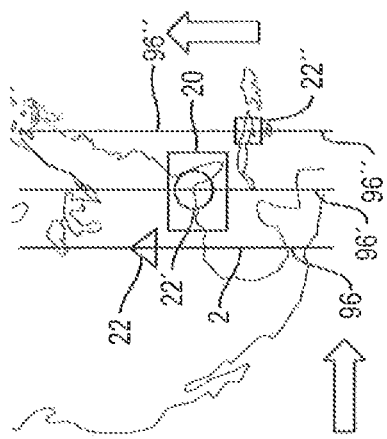
FIG. 9E is an enlarge diagrammatic view of FIG. 9B showing the orbital paths of the three micro-satellite of the first cluster with the second satellite now positioned vertically above Tallahassee, Fla.

Due to the rotation of the earth 14 as well as the orbiting speed of each of the leading first micro-satellite 22, the intermediate second micro-satellite 22', and the trailing third micro-satellite 22", in approximately 10 to 30 minutes time (depending upon the desired (longitudinal) offset and the staggering of the micro-satellites 22, 22', 22") with respect to one another, as shown in FIG. 9E, the second micro-satellite 22' will eventually be directly located vertically above the same specific area, e.g., Tallahassee, Fla., so that Tallahassee, Fla. is thus located within the viewing area 20 of the intermediate second micro-satellite 22'. Since the first and the third micro-satellites 22, 22" are both longitudinally offset and staggered (in the latitude direction) with respect to the second micro-satellite 22', Tallahassee, Fla. is no longer within the viewing area 20 of the first micro-satellite 22 and Tallahassee, Fla. is not yet located within the viewing area 20 of the third micro-satellite 22". According, as described herein, the second micro-satellite 22' operates to scan across its viewing area 20, i.e., either west (left) to east (right) or east (right) to west (left), and eventually Tallahassee, Fla. will fall within the field of view 30 of the spectrometer 10 of the second micro-satellite 22' so that the spectrometer 10 of the second micro-satellite 22' can then collect a second set of data/observations, approximately 10 to 30 minutes after the first set of data/observations by the first micro-satellite 22, relating to the atmospheric conditions located above Tallahassee, Fla.

Figure 9F:
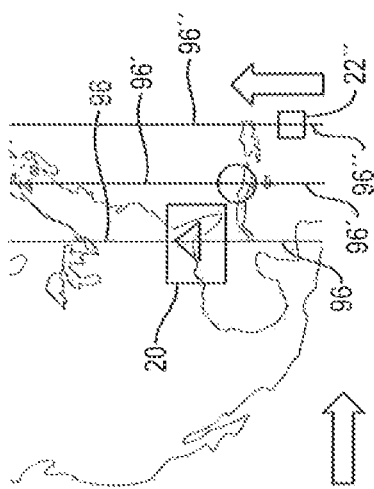
FIG. 9F is an enlarge diagrammatic view of FIG. 9C showing the orbital paths of the three micro-satellite of the first cluster with the third second satellite now positioned vertically above Tallahassee, Fla.

Again, due to the rotation of the earth 14 as well as the orbiting speed of each one of the leading first micro-satellite 22, the intermediate second micro-satellite 22', and the trailing third micro-satellite 22", in approximately 10 to 30 minutes time (depending upon the desired staggering of the micro-satellites 22, 22', 22"), as shown in FIG. 9F, the trailing third micro-satellite 22" will then eventually be located vertically above the same specific area, e.g., Tallahassee, Fla., so that Tallahassee, Fla. is thus located within the viewing area 20 of the third micro-satellite 22". Since the first and the second micro-satellites 22, 22' are both (longitudinally) offset and staggered (in the latitude direction) with respect to the third micro-satellite 22", Tallahassee, Fla. is no longer within the viewing area 20 of either the first micro-satellite 22 or the second micro-satellite 22'. According, as described herein, the third micro-satellite 22" operates to scan across its viewing area 20, i.e., either west (left) to east (right) or east (right) to west (left), and eventually Tallahassee, Fla. will fall within the field of view 30 of the spectrometer 10 of the third micro-satellite 22" so that the spectrometer 10 of the third micro-satellite 22" can then collect a third set of data/observations, approximately 10 to 30 minutes after the second set of data/observations by the second micro-satellite 22', relating to the atmospheric conditions located above Tallahassee, Fla.

It is to be appreciated that both the (longitudinal) offset as well as the staggering (of the latitude direction) of the leading first micro-satellite 22, the intermediate second micro-satellite 22', and the trailing third micro-satellite 22" must take into account the relative orbiting speeds that each one of the micro-satellites 22, 22', 22" is traveling, relative to the earth 14, as well as the rotational speed of earth 14 in order to ensure that the viewing area 20 of both the second micro-satellite 22' and the third micro-satellite 22" are substantially identical to the viewing area 20 of the first micro-satellite 22, but sufficiently delayed in time, so that each one of the three micro-satellite 22, 22', 22" will be permitted to sequentially observe the same viewing area 20 as each one of the three micro-satellites 22, 22', 22" orbits around the earth 14.

With respect to the staggering of the three micro-satellites 22, 22', 22" with respect to one another (in the latitude or possibly in the longitudinal direction), the three micro-satellites 22, 22', 22" are typically staggered so the second micro-satellite 22' will view the same viewing area 20, which was view by the first micro-satellite 22 approximately fifteen minutes earlier. Thereafter, the third micro-satellite 22" will then view the same viewing area 20, which was view by the first micro-satellite 22 approximately thirty minutes earlier and view the same viewing area 20, which was view by the second micro-satellite 22' approximately fifteen minutes earlier. However, it is understood that such staggering can be varied so that this time difference may be as decreased to as low as ten minutes or may be increased to as much as thirty minutes. However, if the (longitudinal) offset and the time difference of the staggering of the micro-satellites 22, 22', 22" (in the latitude or longitudinal direction) is less than ten minutes, then typically not enough time has elapsed between the first, the second and the third sets of observations of the viewing area 20 in order for the second and/or the third micro-satellites 22, 22', 22" to detect the occurrence of significant or meaningful changes in the atmosphere. Alternatively, if the time period between successive observations of the viewing area 20, by the first, the second and the third micro-satellites 22', 22", is greater than 30 minutes, then typically too much time may have elapsed between the observations so that it is difficult for the second and the third micro-satellite 22', 22" to detect changes in the atmosphere which can be readily correlated to the data/observation previously gathered by the first micro-satellite 22. For this reason, it is important that the time between successive observations, by the first, the second and the third micro-satellite 22', 22", is neither too short nor too long so as to facilitate accurate correlation of the observations/data.

That is, the Inventors have found that it is impossible to assign values to moisture radiances without being able to assign definitively a vertical resolution value. As with any radiance in the band, the strength depends upon 1) moisture concentration within the cloud feature, and 2) a vertical position of the cloud feature within the atmosphere relative to the ground, i.e., its altitude. Thus, any radiance of a particular value may alternatively represent 1) a cloud feature which is more concentrated and located vertically lower in the atmosphere, as well as 2) a cloud feature which is less concentrated and located vertically higher in the atmosphere. The present invention seeks to address this issue by observing spectral radiances in order to create a vertical profile and then using temperature profiles and water radiances in order to create a separate moisture vertical profile. The present invention also provides finer atmospheric measurements so that it is possible to observe and detect smaller changes, on a smaller/finer scale, thereby resulting in an improvement relating to spatial and temporal resolution. Together, this ensures that the present invention provides more accurate information for any given radiance values observed.

As is apparent from the above discussion, the method and the system, according to the present invention, builds on the hyperspectral sounding measurement methods used in NASA's AIRS instrument and others. These instruments obtain spectral radiance measurements that cover (mostly) the globe. For each spatial location on the globe observed, these instruments observe hundreds of spectral channels. These spectral channels are carefully selected with respect to the characteristic emission spectral of key gases in the atmosphere, including carbon dioxide and water vapor. While the above general method is known, a specific subset of spectral channels are selected that provide the information need with respect to the troposphere, which is the lower and more dynamic portion of the atmosphere. Specifically, the present invention utilizes the spectral emission channels near 2385 $cm^{-1}$ (near 4.3 micrometers wavelength), from which the temperature vertical profile is derived or inferred, and the spectral region from ~2000 $cm^{-1}$ down to (currently) as low as 1750 $cm^{-1}$ which are sensitive to water vapor at different altitudes. These water-vapor region radiances are used, together with the temperature information, to derive the water vapor concentration as a function of altitude, or the moisture vertical profile. Additional channels in the spectral range give information on surface radiance (and temperature) aerosols, clouds, and carbon monoxide in the atmosphere. As discussed above, the channels are selected to provide the required temperature/moisture information for the troposphere without requiring channels that require large amounts of cooling.

It is to be appreciated that a single instrument in LEO cannot provide the information needed to measure the wind velocity vertical profile. As discussed above, this 3D Wind observation depends on three hyperspectral measurements over a specific region, which must be closely spaced in time, e.g., each approximately 10 to 30 minutes after one another. Each hyperspectral observation provides a 3D image of the clouds and the moisture in the atmosphere. The "wind" is actually inferred by first identifying unique and trackable feature(s) in the moisture pattern, or cloud pattern, within a single 3D image obtained by the first satellite 22, and then attempting to detect the same unique and trackable feature(s) two more times, that is, approximately 15 minutes after the first observation in a 3D image obtained by the second satellite 22' of the same viewing area and approximately 30 minutes after the first observation in a 3D image obtained by the third satellite 22" of the same viewing area. The wind is computed by noting how far the same unique and trackable feature(s), observed in the first observation, moved during the respective periods of time, e.g., approximately 15 minutes in the second observation and 30 minutes after the first observation in the third observation. To ensure that the detected change is just due to the wind, the present invention—by having second and third sequential observations/measurements following the first observation/measurement—will check to see if the same unique and trackable feature(s) moved twice as far in 30 minutes (i.e., in the 3D image of third observation/measurement obtained by the third satellite 22") as the same unique and trackable feature(s) moved in 15 minutes (i.e., in the 3D image of second observation/measurement obtained by the second satellite 22'). These are referred to as Motion-Vector Winds.

These "sounding" spectral instruments were developed to provide sharp(er) vertical profiles of the atmosphere relative to earlier multi-spectral instruments. Some of the earlier multi-spectral instruments did observe and track features, and have been used to measure Motion-Vector Winds (from GEO, where one gets multiple images of a region over time with one satellite instrument). The problem is that they were more of a 2D observation of the wind, rather than 3D, because observations from multi-spectral instruments washed out, to a large degree, the vertical dimension. The present invention uses the hyperspectral method to address and fix this "height assignment" problem with present-day Motion-Vector-Winds. While this may possibly be done at GEO with one instrument observing a region as it changes, this is too expensive for hyperspectral.

The important aspect of using a triplet of micro-satellites in LEO for this composite observation is that it is far lower cost, due to the much smaller size of the instruments one can use, when observing the earth from roughly 50× shorter distance or range. It is to be appreciated that the particular orbit used in LEO is more of a choice, and there are a lot of possible orbits for the triplet of micro-satellites. That is, while the present discloses using the sun-synchronous polar orbit because such orbit provides twice-daily coverage of the globe (i.e., scanning of the earth twice a day), with each micro-satellite observing the earth at approximately the same local time (sun position) each day, while preferred, this is not essential. Such orbits happen to have lots of crossings at the poles—again a feature of this orbit, but not essential. Accordingly, it is to be appreciated that the other, high-inclination orbits could also be used without departing from the spirit and scope of the present invention. These polar crossings of the sun-synchronous orbit might allow convenient radio down-link options to polar ground-stations, but this again is not essential.

As is typically, if a polar orbit is selected, one typically needs a slight adjustment in orbital plane between different micro-satellites in a wind-triplet to actually allow them to observe the exact same area—such adjustment is required because the earth rotates while the micro-satellites are in their respective polar orbits. It is to be appreciated that the that the three micro-satellites could, alternatively each be in equatorial orbit (not shown), and such orbits would typically not require such adjustment. However, one associated drawback is that such equatorial orbits do not work well at providing global coverage.

What is essential about the LEO orbits is that the micro-satellites, in a wind triplet arrangement, be spaced far enough in time that the atmosphere (driven by the winds) changes sufficiently between the three sequentially observations/measurements so that the method and the system can observe changes due to features shifting with the wind, but not be so far in time that the features trying to be tracked either dissolve away or evolve too much and thus cannot be recognize by the second and/or third sequential observations/measurements. Observations of cloud and moisture motion vector winds have pegged approximately 15 min as a good time period for cloud winds, and less than 30 as a good time period for moisture winds.

It is to appreciated that the ability to resolve the spatial changes—and infer wind velocity—depends on the spatial sampling and resolution of each individual (3D) image. Coarser resolution makes it difficult to sense these spatial changes. Poor spatial sampling (relative to the spatial resolution) make it difficult to separate out real changes between scenes from apparent ones due only to sampling phase. The present invention selects ~3 km resolution and ~1.5 km sampling (roughly spatial Nyquist sampling), to allow the method and the system, according to the present invention, the possibility of ~1 m/sec rms velocity error in derive wind speed. A total wind speed error of 1-2 m/s rms (rms root-mean-squared) is what experts in numerical weather models advise in order to provide the observation data quality needed to improve the forecast models with new wind observations.

As discussed above, the number of clusters in the constellation, is also a design choice, and not fundamental requirement. It is to be appreciated that by having more clusters increases the aggregate frequency of global wind observations. The currently preferred choice is to have four (4) clusters of three micro-satellites each, in sun-synchronous polar orbit, to provide a global wind refresh rate of three (3) hours. However, this refresh rate changes incrementally with an increasing or decreasing number of clusters. Three clusters would provide less-frequent coverage, e.g., a global wind refresh rate of four (4) hours at a lower system cost, while five (5) or six (6) clusters would provide more frequent coverage, e.g., a global wind refresh rate of about 2.4 hours or about 2.0, respectively—but at higher system cost.

While various embodiments of the present invention have been described in detail, it is apparent that various modifications and alterations of those embodiments will occur to and be readily apparent to those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having," and variations thereof herein, is meant to encompass the items listed thereafter and equivalents thereof as well as additional items while only the terms "consisting of" and "consisting only of" are to be construed in a limitative sense.

Wherefore, we claim:

1. A method of weather observations by a constellation in which the constellation comprises at least a first cluster of three micro-satellites each orbiting around earth, and each of the three micro-satellites comprising a spectrometer, the method comprising:
orbiting the three micro-satellites of the first cluster around the earth in three separate orbits with each of the three separate orbits being offset with respect to one another;
staggering the three micro-satellites with respect to one another as the micro-satellites orbit in the respective orbits;
selecting the offset and the staggering, of each of the three micro-satellites with respect to one another, so that each one of the three micro-satellites have a substantially identical viewing area as each one of the three micro-satellites orbits around the earth;
sequentially observing, via each of the three micro-satellites of the first cluster as the three micro-satellites orbit around the earth, a horizontal motion of one or more features in the atmosphere, wherein the observations from each of the three micro-satellites of the first cluster are collected at different moments in time such that each observation represents the substantially identical viewing area separated by 10-30 minutes when compared to an observation by an adjacent one of the three micro-satellites of the first cluster;
separately gathering atmospheric measurements, via each of the three micro-satellites of the first cluster as the three micro-satellite orbit around the earth, and
providing rate of change data for use in weather forecasting by using infrared temperature soundings, humidity soundings, and a measurement of vertically resolved motion vector winds of the earth.

2. The method according to claim 1, further comprising designing each one of the micro-satellites, of the first cluster, to have a mass of the spectrometer which is 110 pounds or less.

3. The method according to claim 1, further comprising utilizing an avalanche photodiodes detector, as the detector of the spectrometer, which has an intrinsic photo-signal gain and low noise figure that allows operation of the avalanche photodiodes detector at an operating temperature of about 100° K.

4. The method according to claim 1, further comprising observing, via the spectrometer, spectral radiances so as to create a vertical profile of the atmosphere, and then using temperature profiles and water radiances of the atmosphere in order to create a separate moisture vertical profile of the atmosphere.

5. The method according to claim 1, further comprising utilizing spectral emission channels near 2385 cm−1 (near 4.3 micrometers wavelength) from which a temperature vertical profile can be derived or inferred, and also utilizing a spectral region from about 2000 cm−1 to about 1750 cm−1, which spectral emission channels are sensitive to water vapor concentration at different altitudes.

6. The method according to claim 5, further comprising deriving the water vapor concentration as a function of altitude of the atmosphere from water-vapor region radiances and temperature information.

7. The method according to claim 1, further comprising generating a 3D image of at least one of moisture and clouds in the atmosphere from a first hyperspectral observation of a leading satellite of the three micro-satellites,
identifying, within the 3D image of the first hyperspectral observation, at least one unique and trackable feature in a moisture or a cloud pattern;
attempting to detect the identified unique and trackable feature in a 3D image of a second hyperspectral observation of the same area which is obtained by an intermediate satellite of the three micro-satellites approximately 10-30 minutes after the 3D image of the first hyperspectral observation;
inferring movement of the identified unique and trackable feature, which occurs between an initial position of the identified unique and trackable feature in the 3D image of the first hyperspectral observation and a second position of the identified unique and trackable feature in the 3D image of the second observation, as being a result of wind; and
verifying wind by attempting to detect the identified unique and trackable feature in a 3D image of a third hyperspectral observation of the same area, obtained by a trailing satellite of the three micro-satellites, which is approximately 20-60 minutes after the 3D image of the first observation and approximately 10-30 minutes after the 3D image of the second observation.

8. The method according to claim 7, further comprising computing wind by detecting how far the second position of the identified unique and trackable feature, in the 3D image of the second hyperspectral observation, moved with respect to the initial position of the identified unique and trackable feature in the 3D image of the first observation; and verifying that the computed wind is solely due to the wind by determining if a current position of the identified unique and trackable feature, in the 3D image of the third hyperspectral observation, moved approximately twice as far with respect to the initial position of the identified unique and trackable feature as the identified unique and trackable feature moved between the initial position of the identified unique and trackable feature, in the 3D image of the first hyperspectral observation, and the second position of the identified unique and trackable feature, in the 3D image of the second hyperspectral observation.

9. The method according to claim 1, further comprising providing each respective spectrometer with a rotatable reflective mirror, for reflecting light from the earth towards a fore optics lens of the respective spectrometer, and the rotatable reflective mirror facilitates scanning a field of view, of the respective spectrometer, across the respective viewing area of the respective spectrometer for sequentially collecting the observations.

10. The method according to claim 9, further comprising scanning the rotatable reflective mirror of the respective spectrometer, from a first lateral edge of the respective viewing area to an opposite second lateral edge of the respective viewing area so that the field of view of the respective spectrometer gradually scans across the viewing area, from the first lateral edge to the opposite second lateral edge, of the respective spectrometer.

11. The method according to claim 10, further comprising recalibrating the respective spectrometer, via a calibration assembly, prior to the respective spectrometer commencing each scan cycle of the viewing area.

12. The method according to claim 10, further comprising completing each scan of the viewing area, by the respective spectrometer, from the first lateral edge to the opposite second lateral edge, within a time period of between approximately 90-120 seconds.

13. The method according to claim 9, further comprising reflecting the light, which enters the respective spectrometer, off a combined mirror/grating component, which diffracts the light rays that impinge against the diffusing grating to create a spectral dispersion of the light; and reflecting the spectral dispersion of the light toward an avalanche photodiodes detector for detection.

14. The method according to claim 1, further comprising orbiting each one of the three micro-satellites orbiting around earth in a respective sun-synchronous polar orbit which provides scanning of the earth twice a day.

15. The method according to claim 1, further comprising forming the constellation to include at least one other cluster, and the at least one other cluster including three micro-satellites each orbiting around earth, and each of the three micro-satellites of the at least one other cluster orbit around the earth in three separate orbits which are offset and staggered with respect to one another.

16. A method of weather observations by a constellation in which the constellation comprises first, second, third and fourth clusters, and each of the first, the second, second, the third and the fourth clusters comprising three separate micro-satellites orbiting around earth, the method comprising:

arranging the first cluster, the second cluster, the third cluster and the fourth cluster to orbit around the earth with the orbits of the first cluster, the second cluster, the third cluster and the fourth cluster forming a similar angle with respect to each adjacent cluster and crisscrossing with respect to one another;

orbiting the three micro-satellites, of each respective cluster, in three separate orbital paths with each of the three separate orbital paths being offset with respect to one another such that each of the orbital paths, of the three micro-satellites, crisscross one another;

staggering the three micro-satellites, of each respective cluster, with respect to one another;

selecting the offset and the staggering, of each of the three micro-satellites with respect, to one another, such that each one of the three micro-satellites, of each respective duster; have substantially identical orbital paths and viewing area;

sequentially observing, via each of the three micro-satellites of the first cluster, the second cluster, the third cluster, and the fourth cluster as the respective three micro-satellites orbit around the earth, a horizontal motion of one or more features in the atmosphere, and wherein the observations from each of the three micro-satellites within each of the first cluster, the second cluster, the third cluster and the fourth cluster are collected at different moments in time such that each observation represents the substantially identical viewing areas separated 10-30 minutes when compared to the observation of an adjacent one of the three micro-satellites from within a respective cluster;

separately gathering atmospheric measurements, via each of the three micro-satellites of the respective cluster as the three micro-satellites orbit around the earth, and providing rate of change data for use in weather forecasting by using infrared temperature soundings, humidity soundings, and a measurement of vertically resolved motion vector winds of the earth.

17. The method according to claim 16, further comprising designing each one of the micro-satellites, of the first cluster, the second cluster, the third cluster, and the fourth cluster, to have a mass of the spectrometer which is 110 pounds or less;

utilizing an avalanche photodiodes detector, as the detector within the respective spectrometer, which has an intrinsic photo-signal gain and low noise figure that allows operation of the avalanche photodiodes detector at an operating temperature of about 100° K;

observing, via the respective spectrometer, spectral radiances so as to create a vertical profile of the atmosphere, and then using temperature profiles and water radiances of the atmosphere in order to create a separate moisture vertical profile of the atmosphere; and utilizing spectral emission channels near 2385 cm−1 (near 4.3 micrometers wavelength) from which a temperature vertical profile can be derived or inferred, and also utilizing a spectral region from about 2000 cm−1 to about 1750 cm−1, which spectral emission channels are sensitive to water vapor concentration at different altitudes; and deriving the water vapor concentration as a function of altitude of the atmosphere from water-vapor region radiances and temperature information.

18. The method according to claim 16, further comprising, for each, of the first cluster, the second cluster, the third cluster, and the fourth cluster:

identifying, within the 3D image of the first hyperspectral observation, at least one unique and trackable feature in a moisture or a cloud pattern;

attempting to detect the identified unique and trackable feature in a 3D image of a second hyperspectral observation of the same area which is obtained by an intermediate satellite of the three micro-satellites approximately 10-30 minutes after the 3D image of the first hyperspectral observation;

inferring movement of the identified unique and trackable feature, which occurs between an initial position of the identified unique and trackable feature in the 3D image of the first hyperspectral observation and a second position of the identified unique and trackable feature in the 3D image of the second observation, as being a result of wind; and verifying wind by attempting to detect the identified unique and trackable feature in a 3D image of a third hyperspectral observation of the same area, obtained by a trailing satellite of the three micro-satellites, which is approximately 20-60 minutes after the 3D image of the first observation and approximately 10-30 minutes after the 3D image of the second observation.

19. The method according to claim 18, further comprising computing wind by detecting how far the second position of the identified unique and trackable feature, in the 3D image of the second hyperspectral observation, moved with respect to the initial position of the identified unique and trackable feature in the 3D image of the first observation; and verifying that the computed wind is solely due to the wind by determining if a current position of the identified unique and trackable feature, in the 3D image of the third hyperspectral observation, moved approximately twice as far with respect to the initial position of the identified unique and trackable feature as the identified unique and trackable feature moved between the initial position of the identified unique and trackable feature, in the 3D image of the first hyperspectral observation, and the second position of the identified unique and trackable feature, in the 3D image of the second hyperspectral observation.

20. The method according to claim 1, further comprising providing each respective spectrometer with a rotatable reflective mirror, for reflecting light from the earth towards a fore optics lens of the respective spectrometer, and the rotatable reflective mirror facilitates scanning a field of view, of the respective spectrometer, across the respective viewing area of the respective spectrometer; and scanning the rotatable reflective mirror of the respective spectrometer, from a first lateral edge of the respective viewing area to an opposite second lateral edge of the respective viewing area so that the field of view of the respective spectrometer gradually scans across the viewing area from the first lateral edge to the opposite second lateral edge of the viewing area of the respective spectrometer.

\* \* \* \* \*